(12) United States Patent
Song et al.

(10) Patent No.: US 8,780,744 B2
(45) Date of Patent: Jul. 15, 2014

(54) SELECTIVE ALLOCATION OF DEDICATED CHANNEL (DCH) RESOURCES WITHIN A WIRELESS COMMUNICATIONS SYSTEM

(75) Inventors: Bongyong Song, San Diego, CA (US); Karthika Paladugu, San Diego, CA (US); Yih-Hao Lin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 289 days.

(21) Appl. No.: 13/012,226

(22) Filed: Jan. 24, 2011

(65) Prior Publication Data

US 2012/0026903 A1 Feb. 2, 2012

Related U.S. Application Data

(60) Provisional application No. 61/297,963, filed on Jan. 25, 2010.

(51) Int. Cl.
*H04W 74/00* (2009.01)

(52) U.S. Cl.
USPC .......................................... 370/252; 455/455

(58) Field of Classification Search
USPC .......................................... 370/252; 455/455
See application file for complete search history.

(56) References Cited

U.S. PATENT DOCUMENTS

| | | | |
|---|---|---|---|
| 7,099,346 B1 | 8/2006 | Kanterakis | |
| 7,539,160 B2 | 5/2009 | Virtanen et al. | |
| 7,664,517 B2 | 2/2010 | Ananthanarayanan et al. | |
| 7,680,478 B2 | 3/2010 | Willars et al. | |
| 7,792,079 B2 | 9/2010 | Choi et al. | |
| 7,925,290 B2 | 4/2011 | Rosen et al. | |

(Continued)

FOREIGN PATENT DOCUMENTS

| | | |
|---|---|---|
| CN | 1284394 C | 11/2006 |
| CN | 101095363 A | 12/2007 |

(Continued)

OTHER PUBLICATIONS

Ericsson et al., "Direct transition to DCH", 3GPP Draft, R2-051183 Agreed CR to 25331 [REL-6] on Direct Transition to DCH, 3rd Generation Partnership Project (3GPP), Mobile Competence Centre, 650, Route Des Lucioles, F-06921 Sophia-Antipolis Cedex, France, vol. RAN WG2, No. Beijing, china, Apr. 11, 2005, XP050128340, [retrieved on Apr. 11, 2005].

(Continued)

*Primary Examiner* — Brian D Nguyen
(74) *Attorney, Agent, or Firm* — Michael F. Taveira

(57) ABSTRACT

In an embodiment, a UE determines to transmit a message (e.g., an alert message, a call initiation message). Based on the type of the message to be transmitted, the UE selectively transmits supplemental data configured to prompt an access network to transition the UE to a dedicated channel state (DCS). In another embodiment, an application server configured to arbitrate communication sessions between UEs receives a message for transmission to a target UE. Based on the type of the message to be transmitted to the target UE, the application server selectively transmits, to a serving access network of the target UE, supplemental data configured to prompt the serving access network to transition the target UE to the DCS. In another embodiment, the access network selectively transitions a target UE to the DCS based on whether differently sized messages are received at the access network for transmission to the target UE.

12 Claims, 22 Drawing Sheets

(56) References Cited

U.S. PATENT DOCUMENTS

| | | |
|---|---|---|
| 8,125,962 B2 | 2/2012 | Charpentier et al. |
| 8,160,628 B1 | 4/2012 | Tailor et al. |
| 8,351,358 B2 | 1/2013 | Ketheesan et al. |
| 2002/0173326 A1 | 11/2002 | Rosen et al. |
| 2004/0117504 A1 | 6/2004 | Pedersen et al. |
| 2004/0180675 A1 | 9/2004 | Choi et al. |
| 2005/0141541 A1 | 6/2005 | Cuny et al. |
| 2005/0250504 A1 | 11/2005 | Mikola |
| 2006/0146743 A1 | 7/2006 | Crocker et al. |
| 2006/0148535 A1 | 7/2006 | Schaefer et al. |
| 2006/0271636 A1 | 11/2006 | Balasuriya |
| 2007/0060153 A1 | 3/2007 | Torsner et al. |
| 2007/0147370 A1 | 6/2007 | Hasegawa |
| 2007/0177628 A1 | 8/2007 | Choi et al. |
| 2007/0192439 A1 | 8/2007 | Bhaskaran |
| 2007/0206595 A1 | 9/2007 | Herrero-Veron et al. |
| 2008/0170563 A1* | 7/2008 | Zhu et al. .................... 370/352 |
| 2008/0182594 A1 | 7/2008 | Flore et al. |
| 2009/0023436 A1 | 1/2009 | Wu |
| 2009/0028084 A1 | 1/2009 | Ping |
| 2009/0203331 A1* | 8/2009 | Ranalli et al. ................ 455/90.2 |
| 2009/0257378 A1 | 10/2009 | Cuny et al. |
| 2009/0303909 A1* | 12/2009 | Farhoudi et al. ............. 370/312 |
| 2009/0325621 A1* | 12/2009 | Rossotto et al. ............. 455/518 |
| 2010/0015974 A1 | 1/2010 | Stubbings |
| 2010/0029315 A1 | 2/2010 | Ikeda |
| 2010/0158231 A1* | 6/2010 | Newberg et al. ......... 379/202.01 |
| 2010/0254340 A1 | 10/2010 | Park et al. |
| 2010/0260108 A1 | 10/2010 | Song et al. |
| 2011/0086656 A1 | 4/2011 | Zhou |
| 2011/0122783 A1 | 5/2011 | Lin et al. |
| 2011/0134757 A1 | 6/2011 | Lin et al. |
| 2011/0134836 A1 | 6/2011 | Lin et al. |
| 2011/0134888 A1 | 6/2011 | Lin et al. |
| 2011/0149787 A1 | 6/2011 | Digirolamo et al. |
| 2011/0151944 A1 | 6/2011 | Morgan |
| 2011/0194433 A1 | 8/2011 | Song et al. |
| 2011/0194436 A1 | 8/2011 | Song et al. |
| 2011/0194437 A1 | 8/2011 | Song et al. |
| 2012/0033626 A1 | 2/2012 | Dwyer et al. |
| 2012/0188965 A1 | 7/2012 | Pani et al. |
| 2012/0202497 A1 | 8/2012 | Yan et al. |
| 2013/0188543 A1 | 7/2013 | Dwyer et al. |
| 2013/0315181 A1 | 11/2013 | SONG; Bongyong et al. |

FOREIGN PATENT DOCUMENTS

| | | |
|---|---|---|
| EP | 2152031 | 2/2010 |
| GB | 2377585 A | 1/2003 |
| JP | 2004007652 A | 1/2004 |
| JP | 2004289841 A | 10/2004 |
| JP | 2007174471 A | 7/2007 |
| JP | 2007214711 A | 8/2007 |
| JP | 2007522763 A | 8/2007 |
| JP | 2007267150 A | 10/2007 |
| JP | 2008519515 A | 6/2008 |
| JP | 2009273185 A | 11/2009 |
| JP | 2010041324 A | 2/2010 |
| WO | WO 9966748 A1 | 12/1999 |
| WO | WO 2005079085 A1 | 8/2005 |
| WO | WO 2009145521 A2 | 12/2009 |
| WO | WO 2010135312 A2 | 11/2010 |

OTHER PUBLICATIONS

International Search Report and Written Opinion—PCT/US2011/022447, International Search Authority—European Patent Office—Sep. 19, 2011.

Nokia Corporation et al., "TCTV measurement correction to support direct transition to DCH", 3GPP Draft, 25331_CRXXXX (REL8) R2-094982, 3rd Generation Partnership Project (3GPP), Mobile Competence Centre, 650, Route Des Lucioles, F-06921 Sophia-Antipolis Cedex, France, No. Shenzhen, China, Aug. 24, 2009, XP050389612, [retrieved on Aug. 21, 2009].

European Search Report—EP13169787—Search Authority—Munich—Jun. 28, 2013.

* cited by examiner

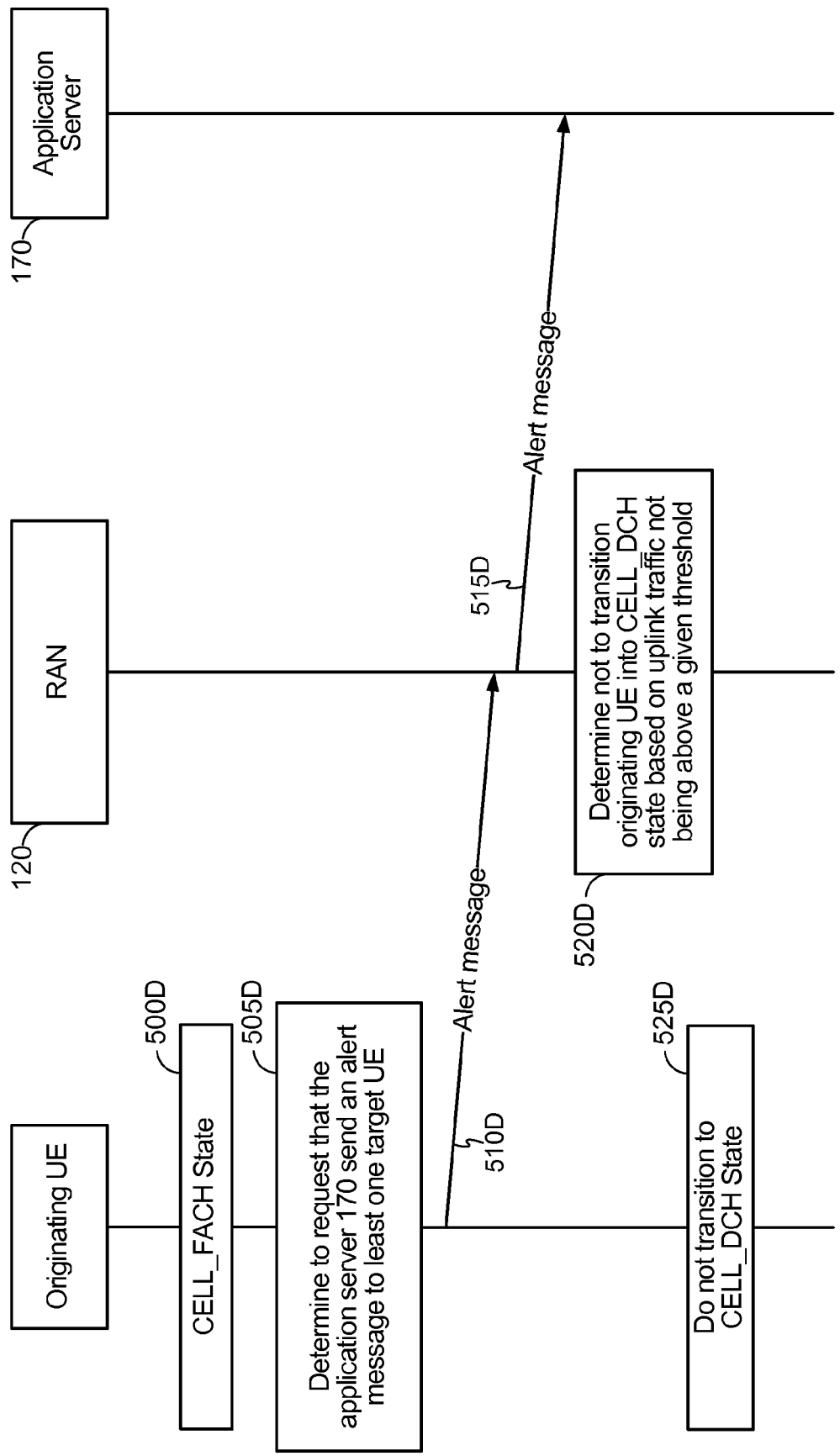

SELECTIVE ALLOCATION OF DEDICATED CHANNEL (DCH) RESOURCES WITHIN A WIRELESS COMMUNICATIONS SYSTEM

CLAIM OF PRIORITY UNDER 35 U.S.C. §119

The present application for patent claims priority to Provisional Application No. 61/297,963 entitled "SELECTIVE ALLOCATION OF DEDICATED CHANNEL (DCH) RESOURCES WITHIN A WIRELESS COMMUNICATIONS SYSTEM" filed on Jan. 25, 2010 and assigned to the assignee hereof and hereby expressly incorporated by reference herein.

REFERENCE TO CO-PENDING APPLICATIONS FOR PATENT

The present application for patent is related to U.S. Application No. 61/301,929, entitled "MANAGING DEDICATED CHANNEL RESOURCE ALLOCATION TO USER EQUIPMENT BASED ON RADIO BEARER TRAFFIC WITHIN A WIRELESS COMMUNICATIONS SYSTEM", filed on Feb. 5, 2010, and also to co-pending U.S. application Ser. No. 12/781,666, entitled "TRANSITIONING A USER EQUIPMENT (UE) TO A DEDICATED CHANNEL STATE DURING SETUP OF A COMMUNICATION SESSION DURING A WIRELESS COMMUNICATIONS SYSTEM", filed on May 17, 2010, each of which are assigned to the assignee hereof, and each of which are expressly incorporated by reference herein.

BACKGROUND OF THE INVENTION

1. Field of the Invention

Embodiments of the invention relate to selectively allocating dedicated channel (DCH) resources within a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

In W-CDMA wireless communication systems, user equipments (UEs) receive signals from fixed position Node Bs (also referred to as cell sites or cells) that support communication links or service within particular geographic regions adjacent to or surrounding the base stations. Node Bs provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the Node Bs generally interact with UEs through an over the air interface and with the RAN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as W-CDMA, CDMA, FDMA, TDMA, GSM, etc. In a dispatch model, communication between endpoints (e.g., UEs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

SUMMARY

In an embodiment, a UE determines to transmit a message (e.g., an alert message, a call initiation message). Based on the type of the message to be transmitted, the UE selectively transmits supplemental data configured to prompt an access network to transition the UE to a dedicated channel state (DCS). In another embodiment, an application server configured to arbitrate communication sessions between UEs receives a message for transmission to a target UE. Based on the type of the message to be transmitted to the target UE, the application server selectively transmits, to a serving access network of the target UE, supplemental data configured to prompt the serving access network to transition the target UE to the DCS. In another embodiment, the access network selectively transitions a target UE to the DCS based on whether differently sized messages are received at the access network for transmission to the target UE.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which:

FIGS. 5C and 5D illustrate embodiments whereby a network communication entity performing the process of FIG. 5A corresponds to an originating UE attempting to transmit a call request message and call alert message, respectively, to an application server.

DETAILED DESCRIPTION

Figure 1:
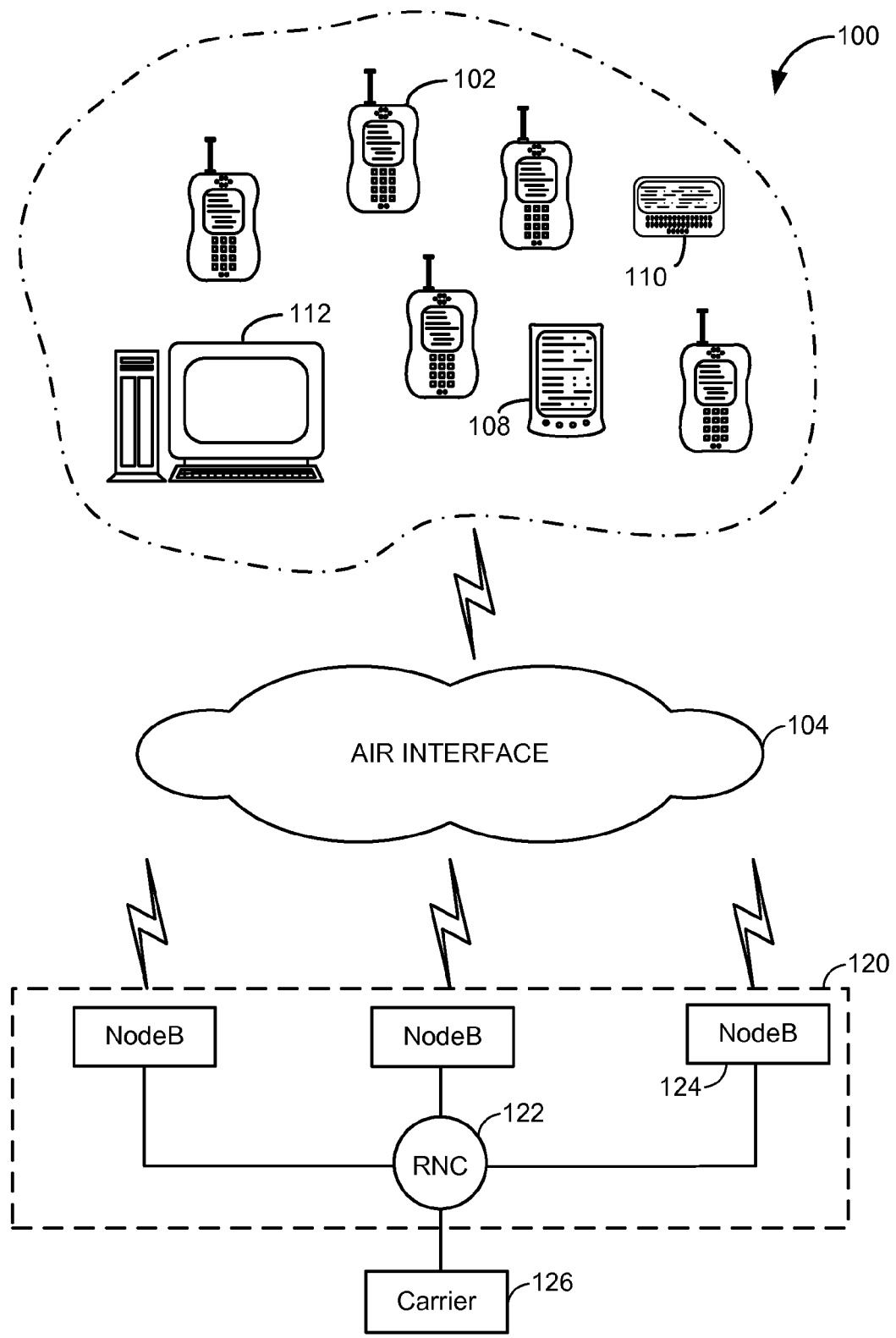
FIG. 1 is a diagram of a wireless network architecture that supports user equipments and radio access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple UEs.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal", "AT", "wireless device", "client device", "mobile terminal", "mobile station" and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2A:
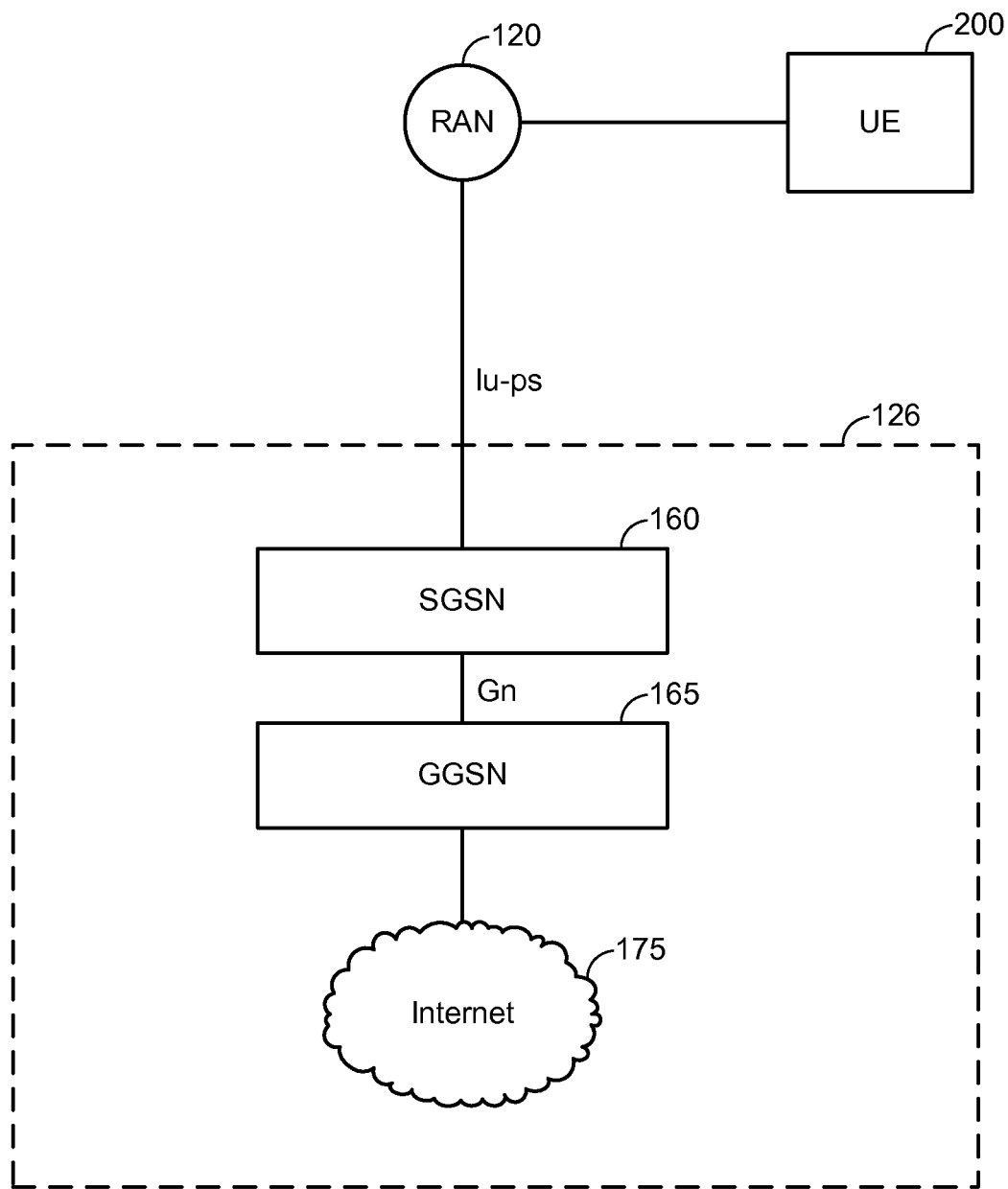
FIG. 2A illustrates the core network of FIG. 1 according to an embodiment of the present invention.

FIG. 2A illustrates the core network 126 according to an embodiment of the present invention. In particular, FIG. 2A illustrates components of a General Packet Radio Services (GPRS) core network implemented within a W-CDMA system. In the embodiment of FIG. 2A, the core network 126 includes a Serving GPRS Support Node (SGSN) 160, a Gateway GPRS Support Node (GGSN) 165 and an Internet 175. However, it is appreciated that portions of the Internet 175 and/or other components may be located outside the core network in alternative embodiments.

Generally, GPRS is a protocol used by Global System for Mobile communications (GSM) phones for transmitting Internet Protocol (IP) packets. The GPRS Core Network (e.g., the GGSN 165 and one or more SGSNs 160) is the centralized part of the GPRS system and also provides support for W-CDMA based 3G networks. The GPRS core network is an integrated part of the GSM core network, provides mobility management, session management and transport for IP packet services in GSM and W-CDMA networks.

The GPRS Tunneling Protocol (GTP) is the defining IP protocol of the GPRS core network. The GTP is the protocol which allows end users (e.g., access terminals) of a GSM or W-CDMA network to move from place to place while continuing to connect to the internet as if from one location at the GGSN 165. This is achieved transferring the subscriber's data from the subscriber's current SSGN 160 to the GGSN 165, which is handling the subscriber's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2A, the GGSN 165 acts as an interface between the GPRS backbone network (not shown) and the external packet data network 175. The GGSN 165 extracts the packet data with associated packet data protocol (PDP) format (e.g., IP or PPP) from the GPRS packets coming from the SGSN 160, and sends the packets out on a corresponding packet data network. In the other direction, the incoming data packets are directed by the GGSN 165 to the SGSN 160 which manages and controls the Radio Access Bearer (RAB) of the destination UE served by the RAN 120. Thereby, the GGSN 165 stores the current SGSN address of the target UE and his/her profile in its location register (e.g., within a PDP context). The GGSN is responsible for IP address assignment and is the default router for the connected UE. The GGSN also performs authentication and charging functions.

The SGSN 160 is representative of one of many SGSNs within the core network 126, in an example. Each SGSN is responsible for the delivery of data packets from and to the UEs within an associated geographical service area. The tasks of the SGSN 160 includes packet routing and transfer, mobility management (e.g., attach/detach and location management), logical link management, and authentication and charging functions. The location register of the SGSN stores location information (e.g., current cell, current VLR) and user profiles (e.g., IMSI, PDP address(es) used in the packet data network) of all GPRS users registered with the SGSN 160, for example, within one or more PDP contexts for each user or UE. Thus, SGSNs are responsible for (i) de-tunneling downlink GTP packets from the GGSN 165, (ii) uplink tunnel IP packets toward the GGSN 165, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in Universal Mobile Telecommunications System (UMTS) system architecture) communicates with the SGSN 160 via an Iu interface, with a transmission protocol such as Frame Relay or IP. The SGSN 160 communicates with the GGSN 165 via a Gn interface, which is an IP-based interface between SGSN 160 and other SGSNs (not shown) and internal GGSNs, and uses the GTP protocol defined above (e.g., GTP-U, GTP-C, GTP', etc.). While not shown in FIG. 2A, the Gn interface is also used by the Domain Name System (DNS). The GGSN 165 is connected to a Public Data Network (PDN) (not shown), and in turn to the Internet 175, via a Gi interface with IP protocols either directly or through a Wireless Application Protocol (WAP) gateway.

The PDP context is a data structure present on both the SGSN 160 and the GGSN 165 which contains a particular UE's communication session information when the UE has an active GPRS session. When a UE wishes to initiate a GPRS communication session, the UE must first attach to the SGSN 160 and then activate a PDP context with the GGSN 165. This allocates a PDP context data structure in the SGSN 160 that the subscriber is currently visiting and the GGSN 165 serving the UE's access point.

Figure 2B:
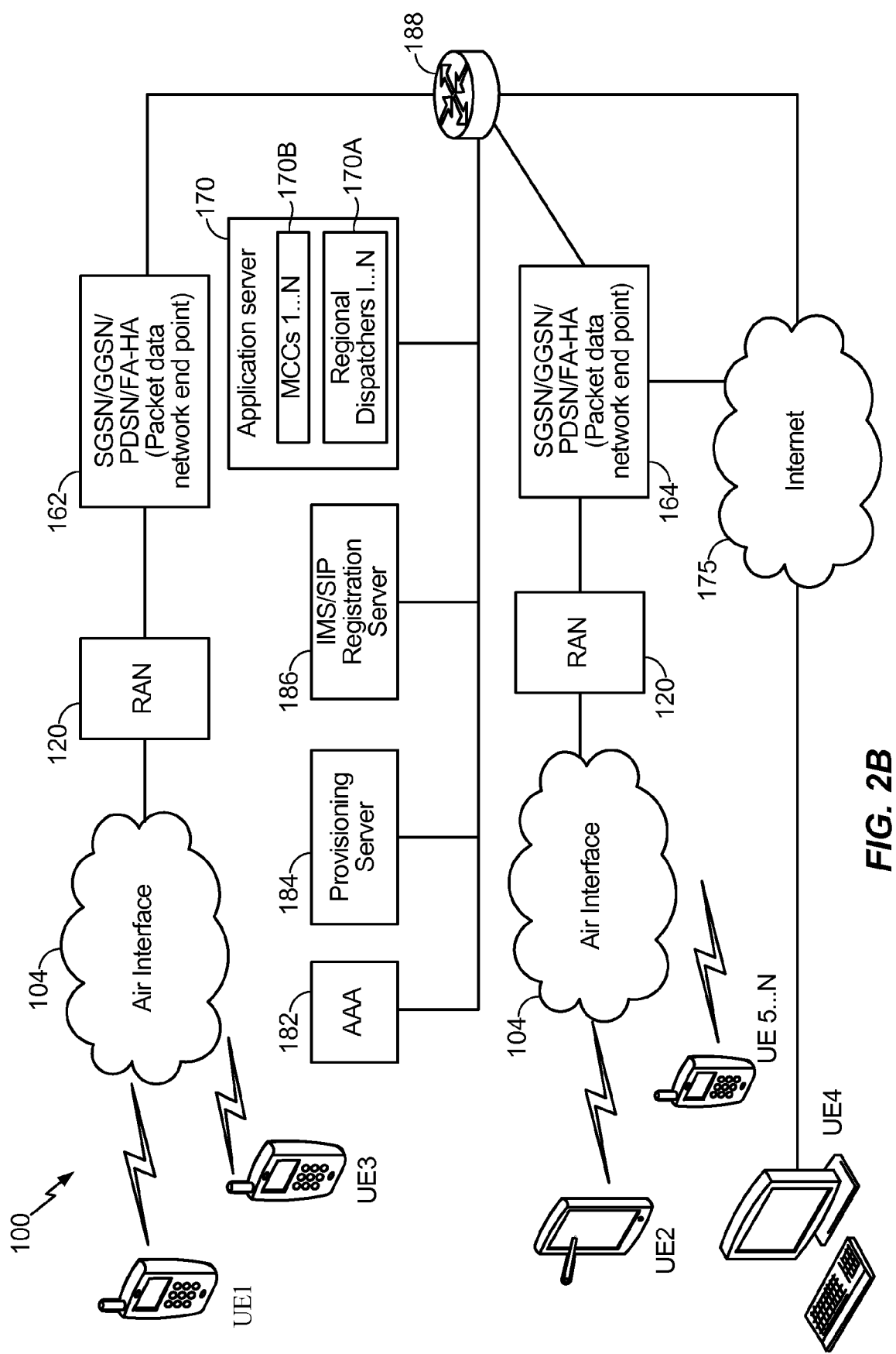
FIG. 2B illustrates an example of the wireless communications system 100 of FIG. 1 in more detail.

FIG. 2B illustrates an example of the wireless communications system 100 of FIG. 1 in more detail. In particular, referring to FIG. 2B, UEs 1 ... N are shown as connecting to the RAN 120 at locations serviced by different packet data network end-points. The illustration of FIG. 2B is specific to W-CDMA systems and terminology, although it will be appreciated how FIG. 2B could be modified to confirm with a 1x EV-DO system. Accordingly, UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. UEs 2 and 5 ... N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. UE 4 connects directly to the Internet 175, and through the Internet 175 can then connect to any of the system components described above.

Referring to FIG. 2B, UEs 1, 3 and 5 ... N are illustrated as wireless cell-phones, UE 2 is illustrated as a wireless tablet-PC and UE 4 is illustrated as a wired desktop station. However, in other embodiments, it will be appreciated that the wireless communication system 100 can connect to any type of UE, and the examples illustrated in FIG. 2B are not intended to limit the types of UEs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Further, referring to FIG. 2B, the application server 170 is illustrated as including a plurality of media control complexes (MCCs) 1 ... N 170B, and a plurality of regional dispatchers 1 ... N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between UEs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the UEs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
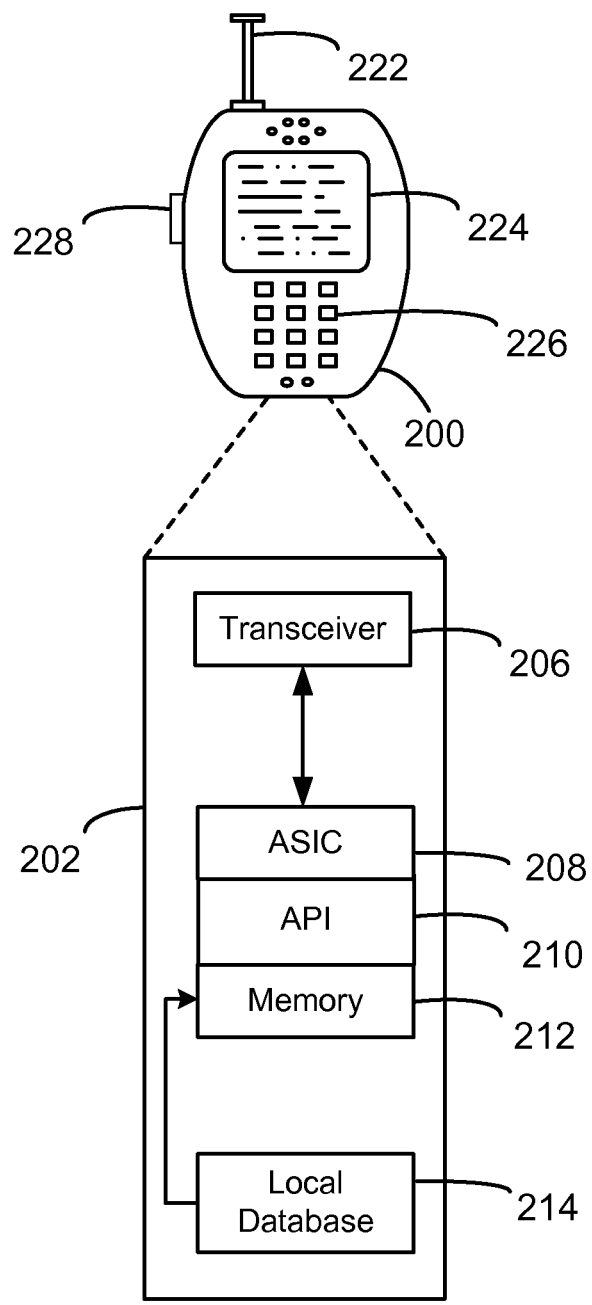
FIG. 3 is an illustration of user equipment in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. For example, in W-CDMA, the data communication is typically between the client device 102, Node B(s) 124, and the RNC 122. The RNC 122 can be connected to multiple data networks such as the core network 126, PSTN, the Internet, a virtual private network, a SGSN, a GGSN and the like, thus allowing the UE 102 or 200 access to a broader communication network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Below, embodiments of the invention are generally described in accordance with W-CDMA protocols and associated terminology (e.g., such as UE instead of mobile station (MS), mobile unit (MU), access terminal (AT), etc., RNC, contrasted with BSC in EV-DO, or Node B, contrasted with BS or MPT/BS in EV-DO, etc.). However, it will be readily appreciated by one of ordinary skill in the art how the embodiments of the invention can be applied in conjunction with wireless communication protocols other than W-CDMA.

In a conventional server-arbitrated communication session (e.g., via half-duplex protocols, full-duplex protocols, VoIP, a group session over IP unicast, a group session over IP multicast, a push-to-talk (PTT) session, a push-to-transfer (PTX) session, etc.), a session or call originator sends a request to initiate a communication session to the application server 170, which then forwards a call announcement message to the RAN 120 for transmission to one or more targets of the call.

User Equipments (UEs), in a Universal Mobile Telecommunications Service (UMTS) Terrestrial Radio Access Network (UTRAN) (e.g., the RAN 120) may be in either an idle mode or a radio resource control (RRC) connected mode.

Based on UE mobility and activity while in a RRC connected mode, the RAN 120 may direct UEs to transition between a number of RRC sub-states; namely, CELL_PCH, URA_PCH, CELL_FACH, and CELL_DCH states, which may be characterized as follows:

In the CELL_DCH state, a dedicated physical channel is allocated to the UE in uplink and downlink, the UE is known on a cell level according to its current active set, and the UE has been assigned dedicated transport channels, downlink and uplink (TDD) shared transport channels, and a combination of these transport channels can be used by the UE.

In the CELL_FACH state, no dedicated physical channel is allocated to the UE, the UE continuously monitors a forward access channel (FACH), the UE is assigned a default common or shared transport channel in the uplink (e.g., a random access channel (RACH), which is a contention-based channel with a power ramp-up procedure to acquire the channel and to adjust transmit power) that the UE can transmit upon according to the access procedure for that transport channel, the position of the UE is known by RAN 120 on a cell level according to the cell where the UE last made a previous cell update, and, in TDD mode, one or several USCH or DSCH transport channels may have been established.

In the CELL_PCH state, no dedicated physical channel is allocated to the UE, the UE selects a PCH with the algorithm, and uses DRX for monitoring the selected PCH via an associated PICH, no uplink activity is possible and the position of the UE is known by the RAN 120 on cell level according to the cell where the UE last made a cell update in CELL_FACH state.

In the URA_PCH state, no dedicated channel is allocated to the UE, the UE selects a PCH with the algorithm, and uses DRX for monitoring the selected PCH via an associated PICH, no uplink activity is possible, and the location of the UE is known to the RAN 120 at a Registration area level according to the UTRAN registration area (URA) assigned to the UE during the last URA update in CELL_FACH state.

Accordingly, URA_PCH State (or CELL_PCH State) corresponds to a dormant state where the UE periodically wakes up to check a paging indicator channel (PICH) and, if needed, the associated downlink paging channel (PCH), and it may enter CELL_FACH state to send a Cell Update message for the following event: cell reselection, periodical cell update, uplink data transmission, paging response, re-entered service area. In CELL_FACH State, the UE may send messages on the random access channel (RACH), and may monitor a forward access channel (FACH). The FACH carries downlink communication from the RAN 120, and is mapped to a secondary common control physical channel (S-CCPCH). From CELL_FACH State, the UE may enter CELL_DCH state after a traffic channel (TCH) has been obtained based on messaging in CELL_FACH state. A table showing conventional dedicated traffic channel (DTCH) to transport channel mappings in radio resource control (RRC) connected mode, is in Table 1 as follows:

TABLE 1

| DTCH to Transport Channel mappings in RRC connected mode | | | | | |
|---|---|---|---|---|---|
| | RACH | FACH | DCH | E-DCH | HS-DSCH |
| CELL_DCH | No | No | Yes | Yes | Yes |
| CELL_FACH | Yes | Yes | No | Yes (rel. 8) | Yes (rel. 7) |
| CELL_PCH | No | No | No | No | Yes (rel. 7) |
| URA_PCH | No | No | No | No | No | wherein the notations (rel. 8) and (rel. 7) indicate the associated 3GPP release where the indicated channel was introduced for monitoring or access.

Communication sessions arbitrated by the application server 170, in at least one embodiment, may be associated with delay-sensitive or high-priority applications and/or services. For example, the application server 170 may correspond to a PTT server in at least one embodiment, and it will be appreciated that an important criterion in PTT sessions is fast session set-up as well as maintaining a given level of Quality of Service (QoS) throughout the session.

As discussed above, in RRC connected mode, a given UE can operate in either CELL_DCH or CELL_FACH to exchange data with the RAN 120, through which the given UE can reach the application server 170. As noted above, in CELL_DCH state, uplink/downlink Radio bearers will consume dedicated physical channel resources (e.g., UL DCH, DL DCH, E-DCH, F-DPCH, HS-DPCCH etc). Some of these resources are even consumed for high speed shared channel (i.e., HSDPA) operations. In CELL_FACH state, uplink/downlink Radio bearers will be mapped to common transport channels (RACH/FACH). Thereby, in CELL_FACH state there is no consumption of dedicated physical channel resources.

Conventionally, the RAN 120 transitions the given UE between CELL_FACH and CELL_DCH based substantially on traffic volume, which is either measured at the RAN 120 (e.g., at the serving RNC 122 at the RAN 120) or reported from the given UE itself in one or more measurement reports. However, because a substantial amount of traffic that travels to or from the application server 170 is known to be relatively important (e.g., delay-sensitive, high QoS, etc.) for certain RABs (e.g., a RAB for VoIP or PTT), the RAN 120 can be configured to automatically transition a UE to CELL_DCH state whenever the RAN 120 either (i) receives one or more data packets on the downlink for the specified RAB (or the corresponding RB) from the application server 170 intended for the UE, or (ii) receives one or more data packets from the UE on the uplink for the specified RB intended for the application server 170.

However, transitions to CELL_DCH state are associated with more overhead (e.g., set-up time, resources consumed, etc.) than CELL_FACH state. While preemptively or automatically causing a UE to transition to CELL_DCH state in response to traffic between the UE and the application server 170 can improve performance in the event that a significant amount of messaging is exchanged between the UE and the application server 170 afterwards, the overhead can be wasteful if the message triggering the CELL_DCH state transition was simply an 'alert' message, or an isolated message that is not a precursor to a communication session. For example, these types of alert messages can be one-way, one-time communication messages (except for potential re-transmissions of the alert messages and ACKs to the alert messages) that do not necessarily lead to subsequent messaging from the transmitting or originating UE.

Examples of automatically transitioning UEs to CELL_DCH state responsive to UE-traffic to/from the application server 170 are described with respect to FIGS. 4A-4D below.

Figure 4A:
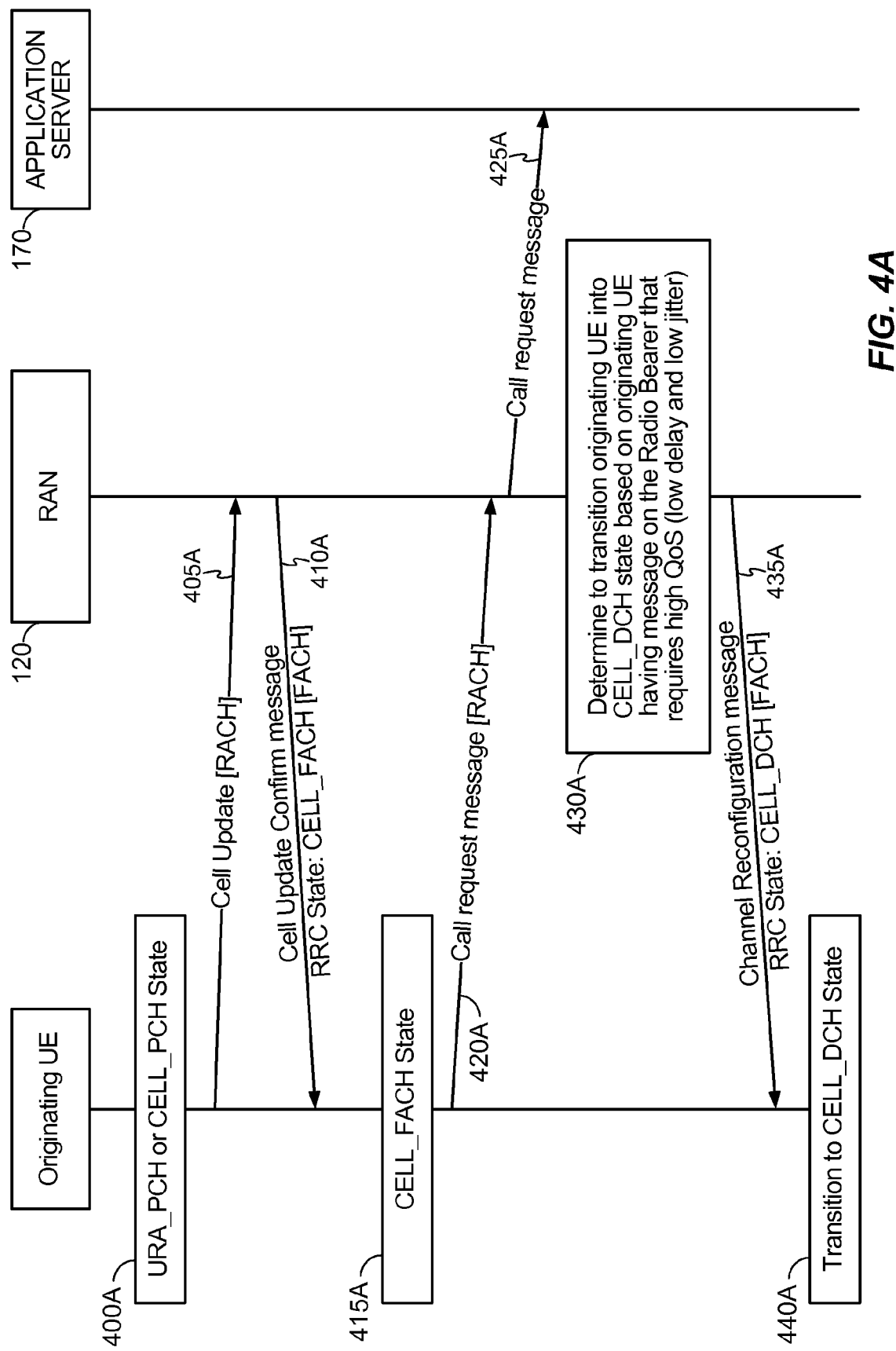
FIG. 4A illustrates an originating UE transitioning to CELL_DCH state and sending a call request message to an application server.

A process by which a given UE can originate a server-arbitrated communication session is described with respect to FIG. 4A. In particular, FIG. 4A (and/or FIGS. 4B through 7D) illustrates a server-arbitrated session setup process wherein the system 100 corresponds to a Universal Mobile Telecommunications System (UMTS) that uses Wideband Code Division Multiple Access (W-CDMA). However, it will be appreciated by one of ordinary skill in the art how FIG. 4A (and/or FIGS. 4B through 7D) can be directed to communication sessions in accordance with protocols other than W-CDMA. Further, certain signaling messages referred to herein are described whereby the application server 170 corresponds to a PTT server. However, it will be appreciated that other embodiments can be directed to servers providing services other than PTT to UEs of the system 100 (e.g., push-to-transfer (PTX) services, VoIP services, group-text sessions, etc.).

Referring to FIG. 4A, assume that a given UE ("originating UE") is operating in either URA_PCH or CELL_PCH state, 400A, and that the given UE performs a cell update procedure, 405A and 410A, and thereby transitions to CELL_FACH state after the cell update procedure, 415A. While in CELL_FACH state, the given UE determines to initiate a communication session to be arbitrated by the application server 170 (e.g., in response to a user of the given UE pressing a PTT button), and thereby the given UE transmits a call request message on the RACH to the RAN 120, 420A. The RAN 120 receives the call request message on the RACH from the given UE, and forwards the call request message to the application server 170, 425A.

The RAN 120 also evaluates the call request message (e.g., by checking an associated RB identifier (ID)) and determines that the packet is associated with the RB that requires high QoS (e.g., low-delay and low jitter) in 430A. The determination of the RAN 120 (e.g., specifically, the serving RNC of the RAN 120) that the given UE is sending a packet on the RAB (to the application server 170 functions) to trigger a transition of the given UE to CELL_DCH state. Accordingly, the RAN 120 transmits a channel reconfiguration message to the given UE over the FACH in order to facilitate the given UE's transition from CELL_FACH to CELL_DCH state, 435A. As will be appreciated, channel reconfiguration messages generally correspond to a Radio Bearer (RB) Reconfiguration message, a Transport Channel (TCH) Reconfiguration message or a Physical Channel (PhyCH or L1) Reconfiguration message, based on whether the Radio Bearer, Transport Channel or Physical Channel of the radio bearer of the given UE to be reconfigured.

Upon receiving the channel reconfiguration message of 435A, the given UE transitions from the CELL_FACH state to the CELL_DCH state, 440A. While not shown in FIG. 4A, the transition of 440A may include decoding the channel reconfiguration message, an L1 synchronization procedure, sending a cell update confirm response message (e.g., RB Reconfiguration Complete message, etc.), etc.

Figure 4B:
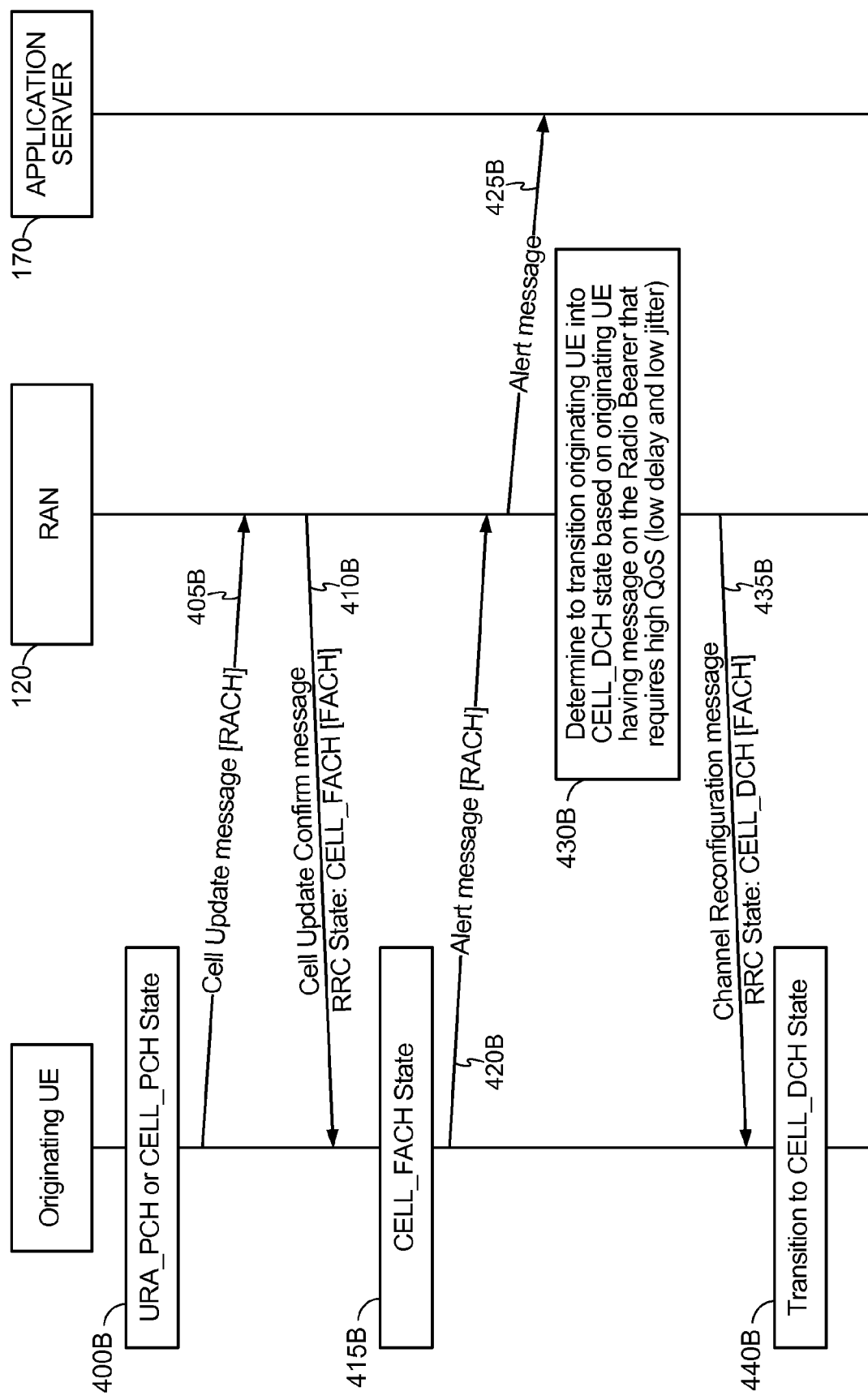
FIG. 4B illustrates an originating UE transitioning to CELL_DCH state and sending an alert message to at least one target UE.

While FIG. 4A is directed to how an originating UE can set-up a communication session with the application server 170, FIG. 4B illustrates an example of how the originating UE can request that the application server 170 send an alert message to at least one target UE. As noted above, alert messages are not necessarily precursors to communication sessions, but rather can simply be configured to check the status of the at least one target UE, send a message that does not require a response to the at least one target UE (e.g., a notification or alert), etc.

Referring to FIG. 4B, assume that a given UE ("originating UE") is operating in either URA_PCH or CELL_PCH state, 400B, and that the given UE performs a cell update procedure, 405B and 410B, and thereby transitions to CELL_FACH state, 415B. While in CELL_FACH state, the given UE determines to request that an alert message be sent to at least one target UE, and thereby the given UE transmits an alert message (or alert message request message) on the RACH to the RAN 120, 420B. The RAN 120 receives the alert message on the RACH from the given UE, and forwards the alert message to the application server 170, 425B.

Similar to 430A of FIG. 4A, in 430B, the RAN 120 evaluates the alert message (e.g., by checking the RB-ID of the alert message) and determines that the packet is associated with the RB that requires high QoS (i.e., low delay and low jitter). Based on this determination, the RAN 120 sends a channel reconfiguration (e.g., RB Reconfiguration message) to the given UE functions to trigger a transition of the given UE to CELL_DCH state, 435B. Upon receiving the cell update confirm message of 435B, the given UE transitions from the CELL_FACH state to the CELL_DCH state, 440B (as in 440A). While not shown in FIG. 4B, the transition of 440B may include decoding the channel reconfiguration message, an L1 synchronization procedure, sending a cell update confirm response message (e.g., RB Reconfiguration Complete message, etc.), etc.

Figure 4C:
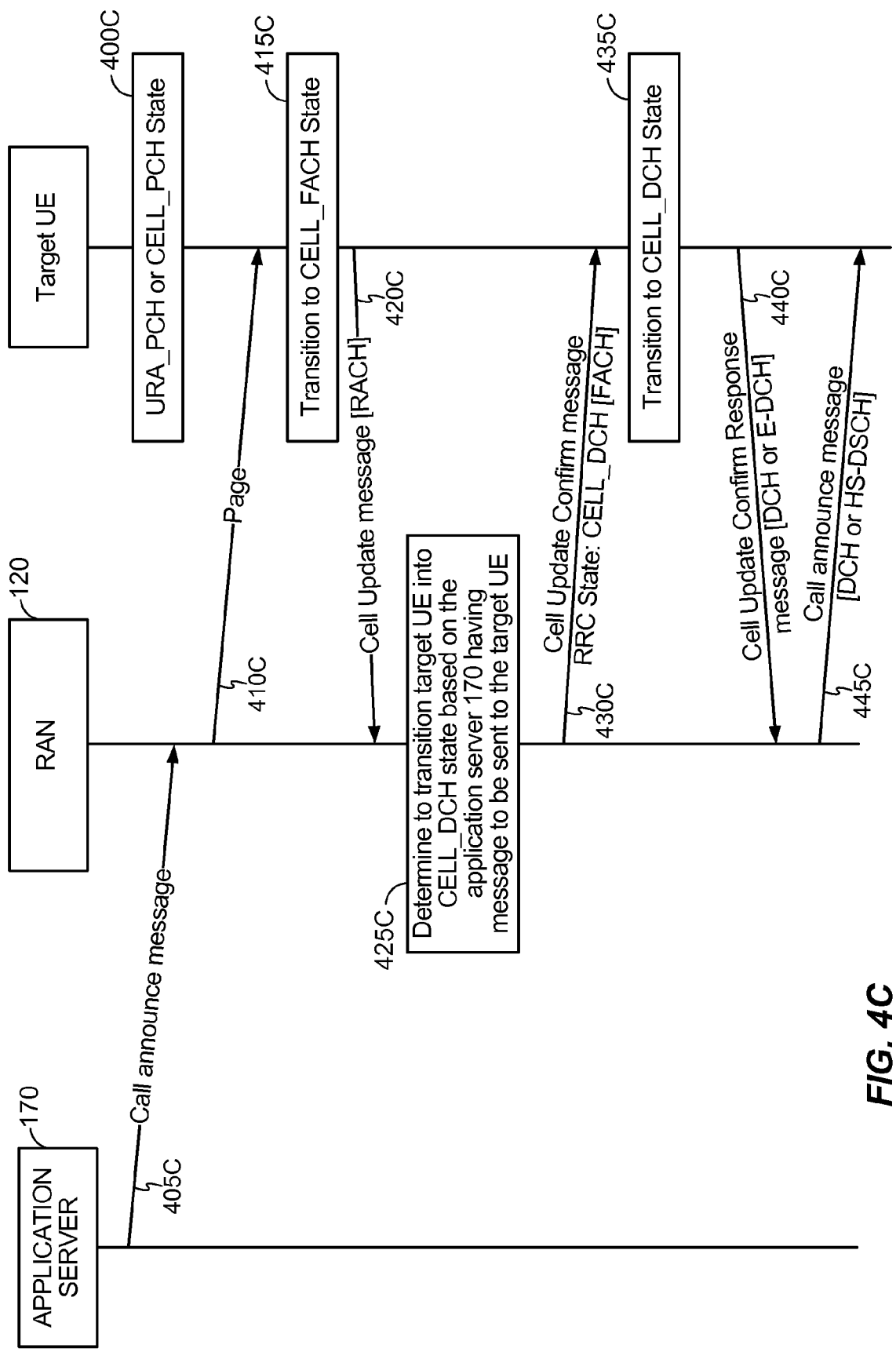
FIGS. 4C and 4D are directed to transitions of a target UE to CELL_DCH state when the application server has data to send to the target UE.
Figure 4D:
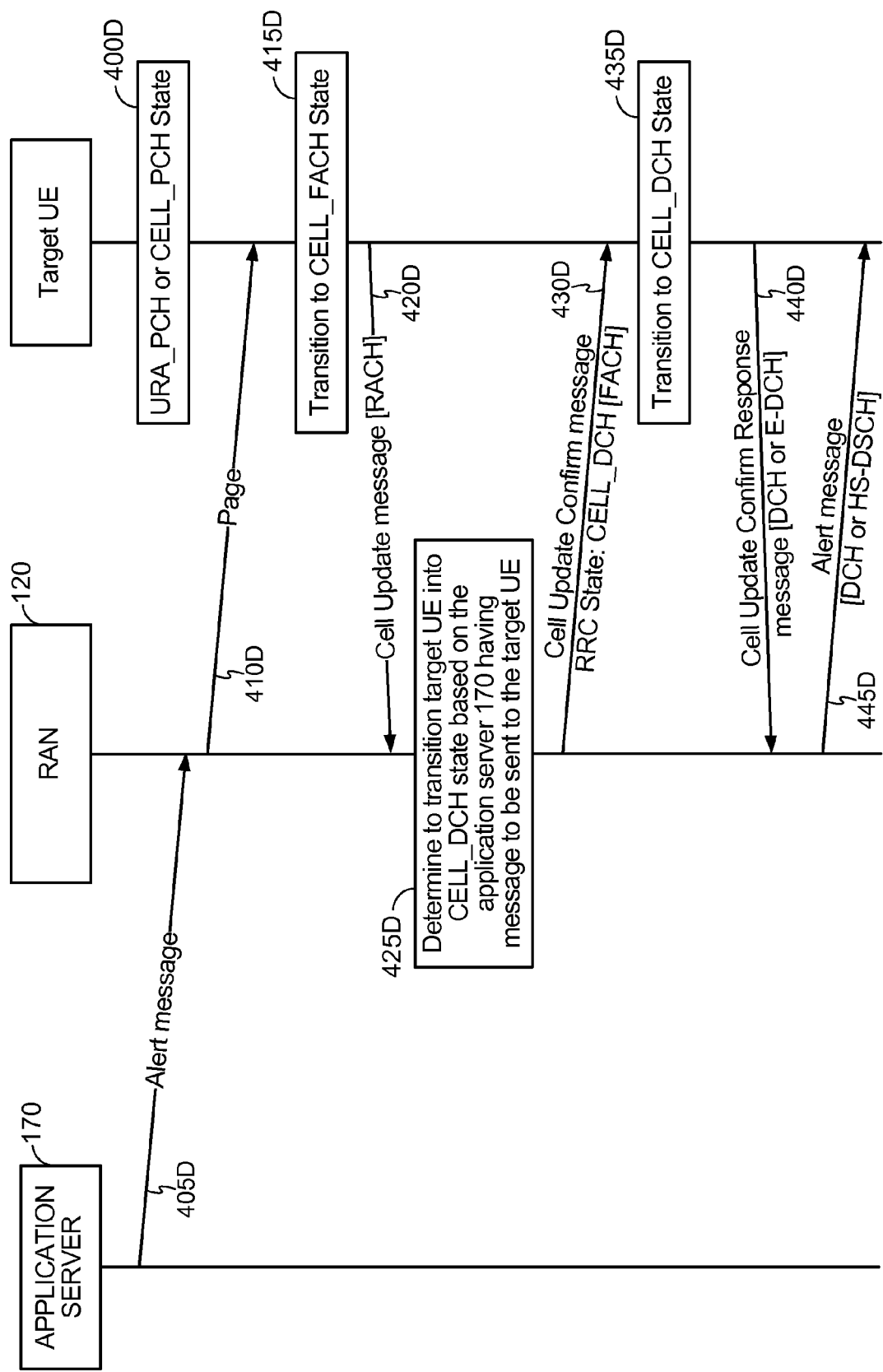

While FIGS. 4A and 4B are related to a transition of an originating UE to CELL_DCH state responsive to traffic between the originating UE and the application server 170, FIGS. 4C and 4D are directed to transitions of a target UE to CELL_DCH state when the application server 170 has data to send to the target UE.

Referring to FIG. 4C, assume that the application server 170 has been requested to initiate a communication session to a given UE ("target UE"), and that the target UE is operating in either URA_PCH state or CELL_PCH state, 400C. Accordingly, the application server 170 sends a call announce message to the RAN 120 for transmission to the target UE, 405C, and the RAN 120 pages the target UE, 410C. Next, the target UE transitions to CELL_FACH state, 415C, and the target UE sends a cell update message to the RAN 120 over the RACH, 420C.

The RAN 120 evaluates the call announce message and determines that the packet is associated with the RB that requires high QoS (i.e., low delay and low jitter), 425C. This determination of the RAN 120 (e.g., specifically, the serving RNC of the RAN 120) triggers a transition of the target UE to CELL_DCH state by reconfiguring the Radio Bearer, Transport Channel or Physical Channel, which is indicated in the cell update confirm message. Accordingly, the RAN 120 transmits the cell update confirm message to the target UE over the FACH, 430C, to transition the target UE to CELL_DCH state.

Upon receiving the cell update confirm message of 430C, the target UE transitions from the CELL_FACH state to the CELL_DCH state, 435C. Upon transitioning to CELL_DCH state in 435C, the target UE transmits a cell update confirm response message (e.g., a Radio Bearer Reconfiguration Complete message, Transport Channel Reconfiguration Complete message, and Physical Channel Reconfiguration Complete message) on either the reverse-link DCH or E-DCH, 440C, after which the RAN 120 transmits the call announce message to the target UE over the DCH or HS-DSCH (e.g., whichever is allocated in the cell update confirm message), 445C.

While FIG. 4C is directed to how the application server 170 can set-up a communication session with the target UE, FIG. 4D illustrates an example of how the application server 170 can send an alert message to the target UE. As noted above, alert messages are not necessarily precursors to communication sessions, but rather can simply be configured to check the status of the at least one target UE, send a message that does not require a response to the at least one target UE (e.g., a notification or alert), etc.

Referring to FIG. 4D, assume that the application server 170 has been requested to send an alert message to a given UE ("target UE"), and that the target UE is operating in either URA_PCH state or CELL_PCH state, 400D. Accordingly, the application server 170 sends an alert message to the RAN 120 for transmission to the target UE, 405D, and the RAN 120 pages the target UE, 410D. Next, the target UE transitions to CELL_FACH state, 415D, and the target UE sends a cell update message to the RAN 120 over the RACH, 420D.

The RAN 120 also evaluates the alert message and determines that the packet (i.e., alert message) is associated with the RB that requires high QoS (i.e., low delay and low jitter), 425D. The determination of the RAN 120 (e.g., specifically, the serving RNC of the RAN 120) triggers a transition of the target UE to CELL_DCH state by reconfiguring the Radio Bearer, Transport Channel or Physical Channel, which is indicated in the cell update confirm message. Accordingly, the RAN 120 transmits a cell update confirm message (e.g., a RB Reconfiguration message) to the target UE over the FACH in order to facilitate the target UE's transition from CELL_FACH to CELL_DCH state, 430D.

Upon receiving the cell update confirm message of 430D, the target UE transitions from the CELL_FACH state to the CELL_DCH state, 435D (as in 435C). Upon transitioning to CELL_DCH state in 435D, the target UE transmits a cell update confirm response message (e.g., a Radio Bearer Reconfiguration Complete message, Transport Channel Reconfiguration Complete message, and Physical Channel Reconfiguration Complete message) on either the reverse-link DCH or E-DCH, 440D, after which the RAN 120 transmits the call alert message to the target UE over the DCH or HS-DSCH (e.g., whichever is allocated in the cell update confirm message), 445D.

While FIGS. 4C and 4D are directed to examples whereby the target UE is initially in URA_PCH or CELL_PCH state, it will be appreciated that the target UE could also be in CELL_FACH state when the RAN 120 receives the application server 170's request to transmit data (e.g., the call announce message in FIG. 4C, or the alert message in FIG. 4D) to the target UE. In the case where the target UE is already in CELL_FACH state, it will be appreciated that the page and cell update messages are not needed (e.g., 410C through 420C of FIG. 4C or 410D through 420D of FIG. 4D can be omitted), and the RAN 120 can simply transition the UE to CELL_DCH by sending the channel reconfiguration message (e.g., Radio Bearer Reconfiguration, Transport Channel Reconfiguration, or Physical Channel Reconfiguration message) as in 430C of FIG. 4C or 430D of FIG. 4D.

As will be appreciated by one of ordinary skill in the art, even though preemptive transitions of a given UE to CELL_DCH state responsive to any traffic between the given UE and the application server 170 can be beneficial in certain scenarios, in the case of alert messages, the overhead may cause degradation of performance in the system and/or an unnecessary waste of system resources. Accordingly, embodiments of the invention are directed to selectively transitioning a given UE in communication with the application server 170 to CELL_DCH state, while still ensuring that traffic associated with communication sessions prompts transitions of the given UE to CELL_DCH state.

Figures 5A, 5B:
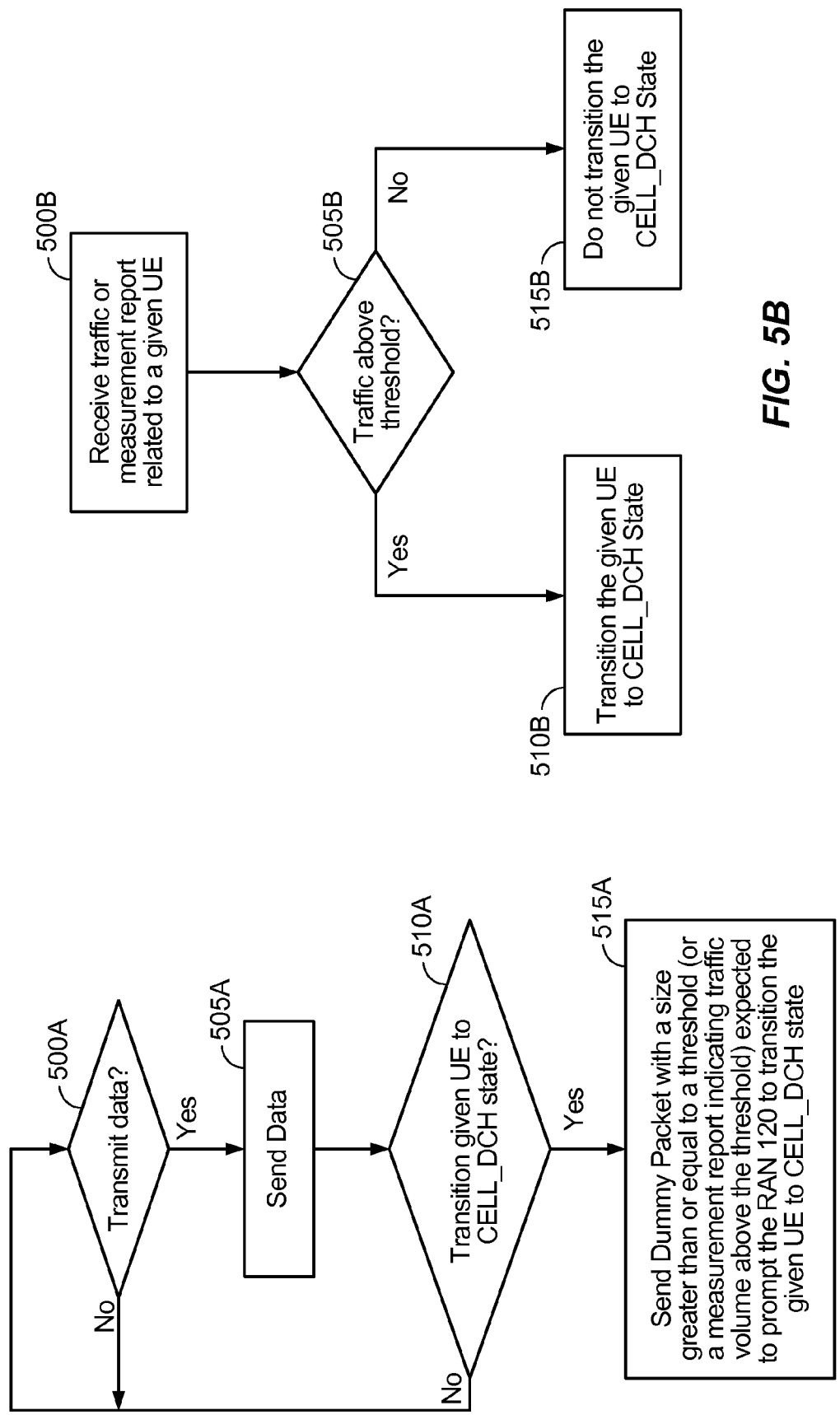
FIG. 5A illustrates a process of transmitting data in accordance with an embodiment of the invention.
FIG. 5B illustrates a process that occurs at a radio access network (RAN) during the process of FIG. 5A in accordance with an embodiment of the invention.

FIG. 5A illustrates a process of transmitting data in accordance with an embodiment of the invention. The process of FIG. 5A occurs either at a UE (e.g., an originating UE or target UE) or the application server 170, and as such FIG. 5A is described below as performed at a 'network communication entity' which can broadly be considered to correspond to any one of these network elements.

Referring to FIG. 5A, the network communication entity determines whether to transmit data to another network communication entity, 500A. For example, the determination of 500A can correspond to an originating UE determining whether to send a call request message to the application server 170 to initiate a communication session with at least one target UE. In another example, the determination of 500A can correspond to the application server 170 determining whether to send data, such as a call announce message announcing a communication session, to at least one target UE. In yet another example, the determination of 500A can correspond to a target UE having data (e.g., an announce ACK) back to the application server 170 after receiving the announce message. Of course, in other embodiments, the determination of 500A can correspond to other types of data for transmission.

If the network communication entity determines not to send data in 500A, no data is transmitted. Alternatively, if the network communication entity determines to send data in 500A, the data is transmitted in 505A. Next, the network communication entity determines whether to set-up a DCH for a given UE associated with the data transmission by transitioning the UE to CELL_DCH state, 510A. For example, if the network communication entity performing the process of FIG. 5A is the originating UE or target UE, then the given UE corresponds to the UE performing the process of FIG. 5A, such that 510A corresponds to a determination of whether the network communication entity itself should transition to CELL_DCH state. In another example, if the network communication entity performing the process of FIG. 5A is the application server 170, then the given UE corresponds to the target UE for which the data transmission of 505A is intended, such that 510A corresponds to a determination of whether to transition the target UE to CELL_DCH state.

If the network communication entity determines not to transition the given UE to CELL_DCH state in 510A, the process of FIG. 5A returns to 500A and waits for a subsequent data transmission from the network communication entity. Alternatively, if the network communication entity determines to transition the given UE to CELL_DCH state in 510A, then the network communication entity determines to transmit a dummy packet that has a size (e.g., a data payload) that is greater than or equal to a given size threshold that is expected to prompt the RAN 120 to transition the given UE to CELL_DCH state, 515A. If the network communication entity is a UE, the determination of 515A will cause the UE to send a measurement report indicative of the traffic volume of the dummy packet, which will prompt the RAN 120 to transition the UE to CELL_DCH state. If the network communication entity is the application server, sending the dummy packet to the UE will cause the RAN 120 to detect a large packet with a size is greater than the RRC state transition threshold to CELL_DCH, which will then cause the RAN 120 to transition the UE to CELL_DCH state.

For example, the given size threshold can correspond to an Event 4a Traffic Volume Measurement (TVM) threshold that is used by the RAN 120 for making CELL_DCH state transition decisions. In other words, when the RAN 120 receives a measurement report message stating the Traffic Volume is greater than the Event 4a threshold, the RAN 120 will transition the UE that is transmitting or receiving the data packet to CELL_DCH state. Accordingly, the network communication entity can use the dummy packet to trigger the CELL_DCH transition selectively in the embodiment of FIG. 5A. Alternatively the dummy packet of 515A can be transmitted by the application server 170 to trigger the RAN 120 to transition a target UE of the data transmission to CELL_DCH state. In a further example, discussed below in more detail, a 'fake' measurement report can be sent in 515A, such that a measurement report indicating traffic volume above the Event 4a TVM threshold is sent to the RAN 120 without a dummy packet actually being sent.

FIG. 5B illustrates a process that occurs at the RAN 120 during the process of FIG. 5A in accordance with an embodiment of the invention. Referring to FIG. 5B, the RAN 120 receives traffic (e.g., one or more data packets) or a measurement report message related to a given UE, 500B. The traffic or traffic volume report received in 500B at the RAN 120 can correspond to receipt of the dummy packet transmission in 515A of FIG. 5A, the measurement report that is triggered by the dummy packet in 515A of FIG. 5A and/or a 'fake' measurement report indicating high traffic volume without an actual intention to transmit the high traffic volume in 515A of FIG. 5A. The RAN 120 compares the size of the traffic, or the traffic volume indicated in the traffic volume report, received in 500B with the given size threshold in 505B. If the comparison indicates that the size is above the given size threshold, then the RAN 120 transitions the given UE, to which the traffic is either intended or sent from, to CELL_DCH state, 510B. However, if the comparison indicates that the size is not above the given size threshold, then the RAN 120 does not make the CELL_DCH transition of the given UE, 515B. As will be appreciated, the dummy packet transmission (or measurement report) of 515A ensures that the RAN 120's comparison at 505B will trigger the CELL_DCH transition at 510B.

FIGS. 5C through 5F illustrate more detailed implementation examples of the processes of FIGS. 5A and 5B. In particular, FIGS. 5C and 5D cover examples whereby the network communication entity performing the process of FIG. 5A corresponds to an originating UE, and FIGS. 5E and 5F cover examples whereby the network communication entity performing the process of FIG. 5A corresponds to the application server 170.

Figure 5C:
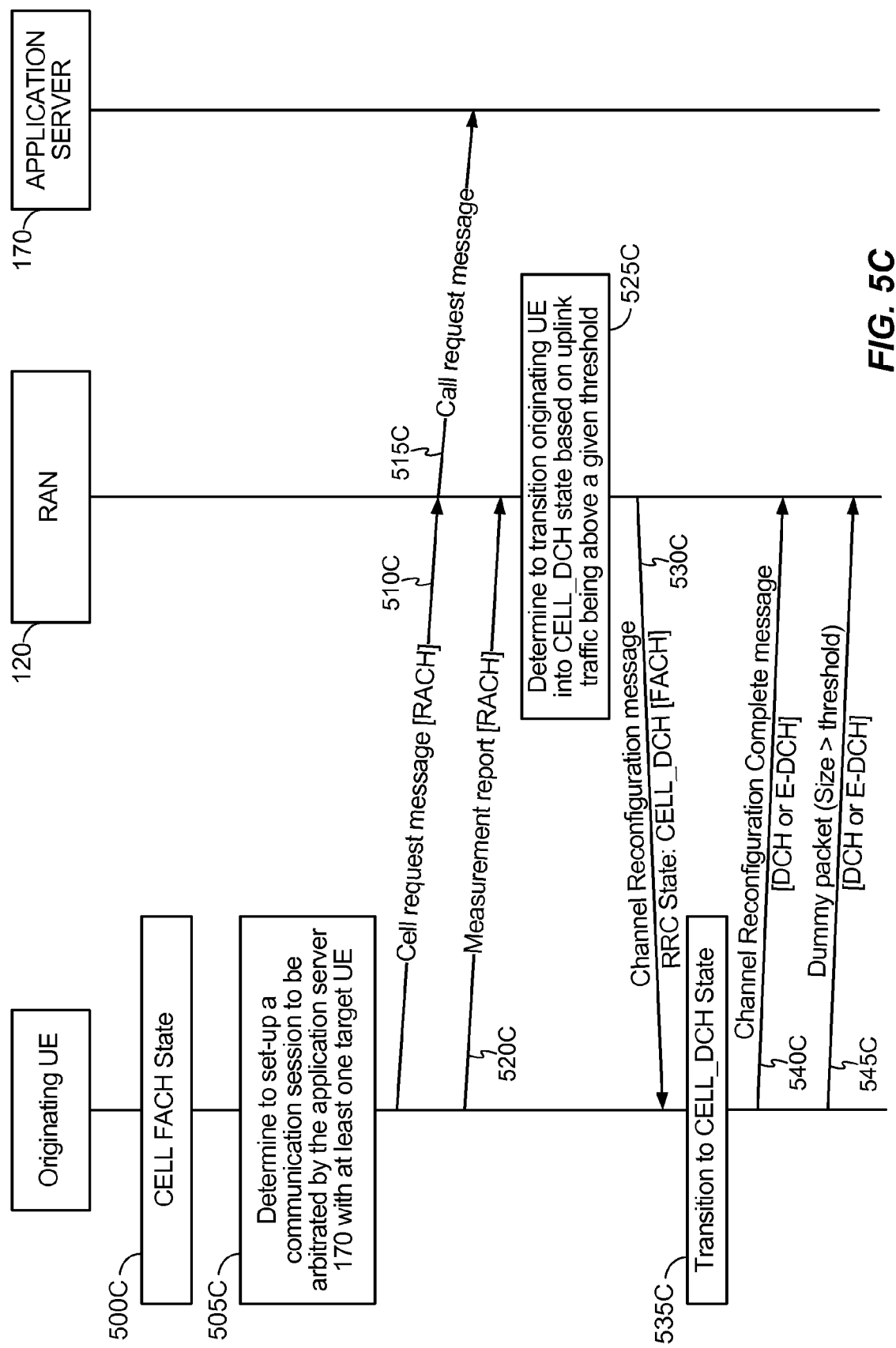

Referring to FIG. 5C, assume that a given UE ("originating UE") is operating in CELL_FACH state, 500C. While in CELL_FACH state, the given UE determines to initiate a communication session to be arbitrated by the application server 170 (e.g., in response to a user of the given UE pressing a PTT button), 505C, and thereby the given UE transmits a call request message on the RACH to the RAN 120, 510C.

The RAN 120 receives the call request message on the RACH from the given UE, and forwards the call request message to the application server 170, 515C.

In the embodiment of FIG. 5C, it may be assumed that the determination by the given UE to initiate the communication session in 505C corresponds to a determination by the given UE to transmit data as in 500A of FIG. 5A and also to transition itself to CELL_DCH state, as in 510A of FIG. 5A. Accordingly, the given UE further determines to transmit a dummy packet with a size greater than the given size threshold, which triggers the UE to generate a measurement report message reporting Event 4a, 520C. The RAN 120 receives the measurement report message (e.g., as in 500B of FIG. 5B) and determines to transition the given UE into CELL_DCH state based on the uplink traffic, or measurement report message in this case, indicating that the given UE's traffic volume for transmission is above the given size threshold, 525C (e.g., as in 505B of FIG. 5B). Accordingly, the RAN 120 transmits a channel reconfiguration message (e.g., a RB Reconfiguration message) on the FACH to facilitate the given UE's transition from CELL_FACH to CELL_DCH state, 530C (e.g., as in 510B of FIG. 5B). Upon receiving the cell update confirm message of 530C, the given UE transitions from the CELL_FACH state to the CELL_DCH state, 535C. While not shown in FIG. 5C, the transition of 535C may include decoding the channel reconfiguration message, an L1 synchronization procedure, etc. The UE sends send a channel reconfiguration complete message (e.g., RB Reconfiguration Complete message, etc.), 540C, and then sends the dummy packet, 545C.

Alternatively, the originating UE can generate a "fake" measurement report message without actually sending the dummy packet. In this alternative embodiment, 500C through 540C are performed as shown in FIG. 5C, but the dummy packet transmission of 545C is then omitted. Thus, as the dummy packet is primarily useful for generating a measurement report message, avoiding radio resource consumption for transmitting the dummy packet can increase the efficiency of the process of FIG. 5C. In this case, at the time a fake measurement report is generated, the amount of traffic volume is not greater than the threshold for Event 4a. However, the UE generates the fake measurement report message to include a false indication of traffic volume that functions to request transition of itself to CELL_DCH state.

Further, while not shown explicitly in FIG. 5C, the application server 170 could also trigger the originating UE's transition into CELL_DCH state by transmitting a dummy packet back to the originating UE. For example, upon receipt of the call request message, the application server 170 can determine to accept the requested session and send a dummy packet back to the originating UE to trigger the RAN 120 to transition the originating UE to CELL_DCH state.

Referring to FIG. 5D, assume that a given UE ("originating UE") is operating in CELL_FACH state, 500D. While in CELL_FACH state, the given UE determines to request that an alert message be sent to at least one target UE, 505D, and thereby the given UE transmits an alert message (or alert message request message) on the RACH to the RAN 120, 510D. The RAN 120 receives the alert message on the RACH from the given UE, and forwards the alert message to the application server 170, 515D.

In the embodiment of FIG. 5D, it may be assumed that the determination by the given UE to send the alert message in 505D corresponds to a determination by the given UE to transmit data as in 500A of FIG. 5A without transitioning itself to CELL_DCH state, as in 510A of FIG. 5A. Accordingly, neither a dummy packet nor a measurement report message indicating an Event 4a condition is transmitted by the given UE, and the RAN 120 thereby does not determine to transition the given UE into CELL_DCH state based on the uplink traffic, because the alert message by itself is not above the given size threshold, 520D (e.g., as in 505B of FIG. 5B) and no measurement report message reporting Event 4a will be sent. Thus, the given UE is not transitioned from the CELL_FACH state to the CELL_DCH state, 525D.

Figure 5E:
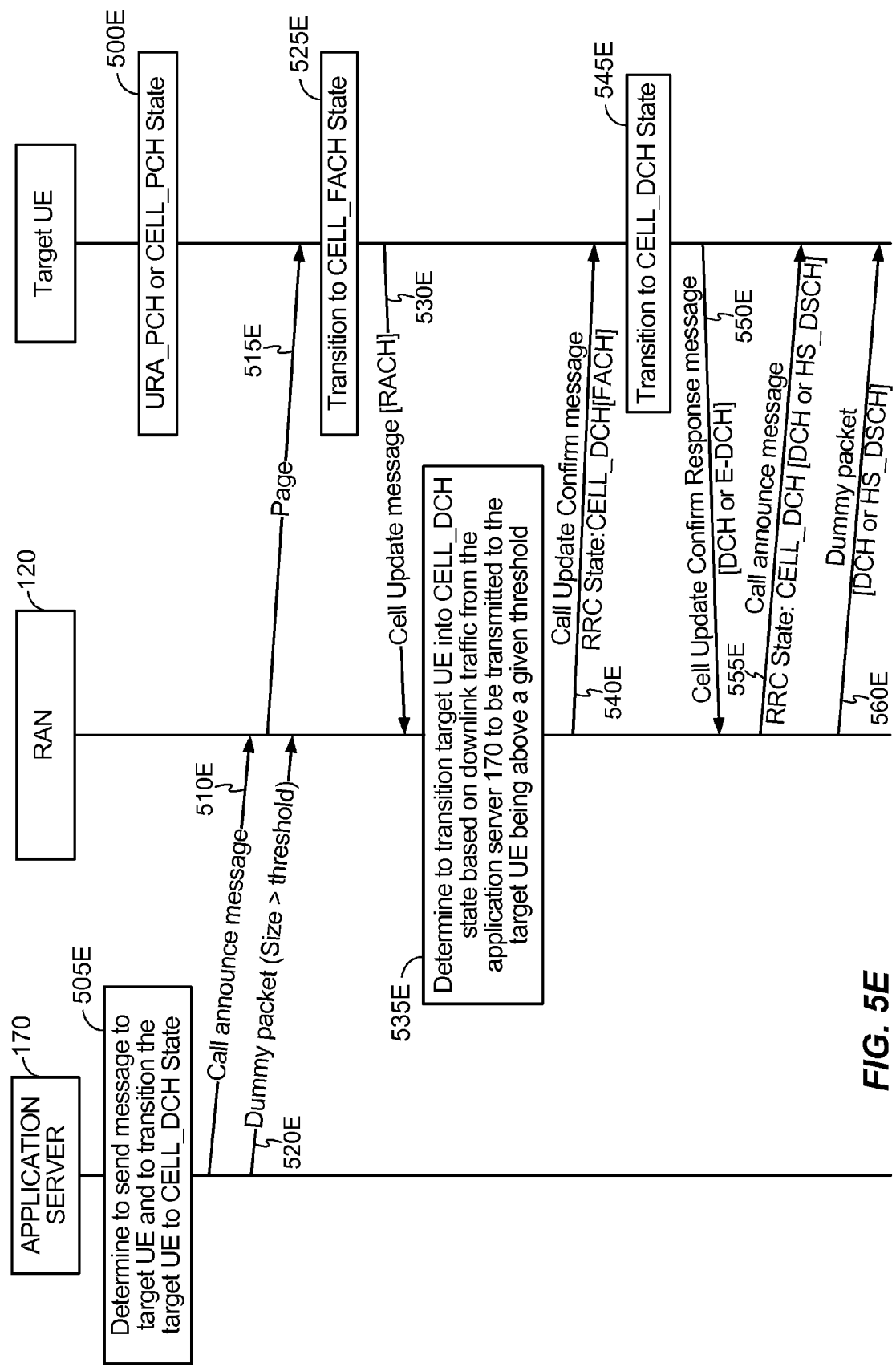
FIGS. 5E and 5F illustrate embodiments whereby a network communication entity performing the process of FIG. 5A corresponds to an application server attempting to transmit a call announce message and call alert message, respectively, to a target UE.

Referring to FIG. 5E, assume that the application server 170 has been requested to initiate a communication session to a given UE ("target UE"), and that the given UE is operating in either URA_PCH state or CELL_PCH state, 500E. Accordingly, the application server 170 determines to send a call announce message to the given UE and also to transition the given UE to CELL_DCH state, 505E. As will be appreciated, the determination of 505E corresponds to a determination to transmit data as in 500A of FIG. 5A and also to transition the given UE (i.e., the target UE, in this case) to CELL_DCH state, as in 510A of FIG. 5A.

Accordingly, the application server 170 sends a call announce message to the RAN 120 for transmission to the target UE, 510E, and the RAN 120 pages the target UE, 515E. The application server 170 further transmits a dummy packet in 520E with a size greater than the given size threshold, (e.g., as in 515A of FIG. 5A). Upon receiving and decoding the page message from 515E, the target UE transitions to CELL_FACH state, 525E, and the target UE transmits a cell update message on the RACH to the RAN 120, 530E.

In 535E, after the RAN 120 receives the dummy packet (e.g., as in 500B of FIG. 5B), the RAN 120 determines to transition the given UE into CELL_DCH state based on the downlink traffic, or dummy packet in this case, being above the given size threshold. In this case, the determination of 535E is responsive to an analysis by the RAN 120 of the size of the dummy packet, and not a measurement report from the UE that is sent responsive to receipt of, or a determination to transmit, the dummy packet. Accordingly, the RAN 120 transmits a cell update confirm message (e.g., a RB Reconfiguration message) on the FACH to facilitate the given UE's transition from CELL_FACH to CELL_DCH state, 540E (e.g., as in 510B of FIG. 5B). Upon receiving the cell update confirm message of 540E, the given UE transitions from the CELL_FACH state to the CELL_DCH state, 545E, after which the target UE sends a cell update confirm response message on the DCH or E-DCH to the RAN 120, 550E, and the RAN 120 sends the call announce message and dummy packet to the target UE on the downlink DCH or HS-DSCH, 555E and 560E.

Figure 5F:
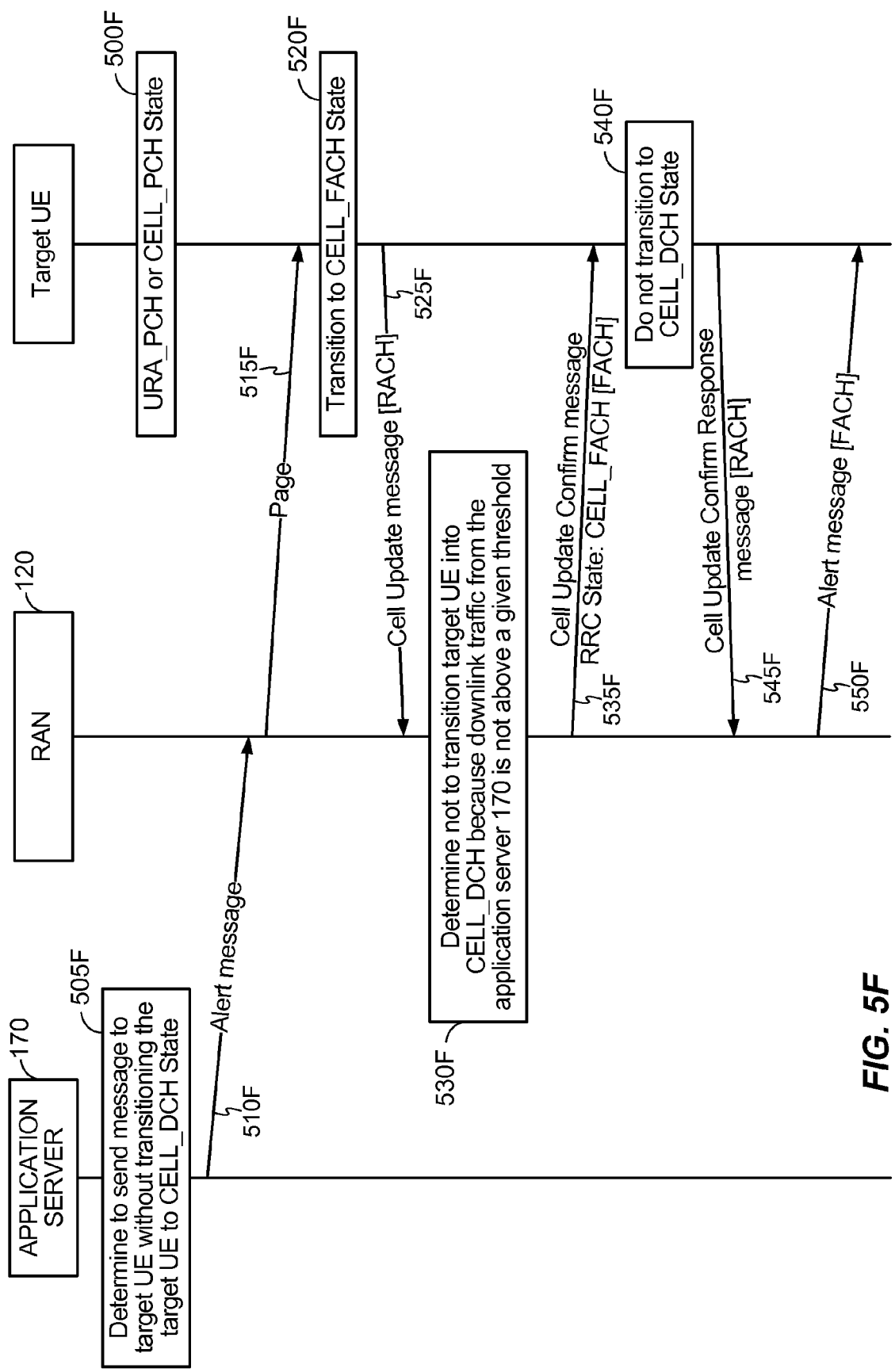

Referring to FIG. 5F, assume that the application server 170 has been requested to send an alert message to a given UE ("target UE"), and that the given UE is operating in either URA_PCH state or CELL_PCH state, 500F. Accordingly, the application server 170 determines to send the alert message to the given UE, 505F. As will be appreciated, because a DCH is not desirable if the application server 170 only has an alert message to send to the given UE, the determination of 505F corresponds to a determination to transmit data as in 500A of FIG. 5A without transitioning the given UE (i.e., the target UE, in this case) to CELL_DCH state, as in 510A of FIG. 5A.

Accordingly, the application server 170 sends the alert message to the RAN 120 for transmission to the target UE, 510F, and the RAN 120 pages the target UE, 515F. Upon receiving and decoding the page message from 515F, the target UE transitions to CELL_FACH state, 520F, and the target UE transmits a cell update message on the RACH to the RAN 120, 525F.

As will be appreciated, a dummy packet is not transmitted by the application server 170, and the RAN 120 does not determine to transition the given UE into CELL_DCH state based on the downlink traffic, because the alert message by itself is not above the given size threshold, 530F (e.g., as in 505B of FIG. 5B). Thus, the given UE is not transitioned from the CELL_FACH state to the CELL_DCH state. As such, the RAN 120 transmits a cell update confirm message on the FACH that is not configured to trigger a transition of the target UE to CELL_DCH state (i.e., RRC state: CELL_FACH), 535F, and the target UE remains in CELL_FACH state, 540F. The target UE transmits a cell update confirm response message on the RACH, 545F, and the alert message is then sent to the target UE on the FACH, 550F.

While FIGS. 5E and 5F are directed to examples whereby the target UE is initially in URA_PCH or CELL_PCH state, it will be appreciated that the target UE could also be in CELL_FACH state when the RAN 120 receives the application server 170's request to transmit data (e.g., the call announce message in FIG. 5E, or the alert message in FIG. 5F) to the target UE. In the case where the target UE is already in CELL_FACH state, it will be appreciated that blocks 515E and 525E through 530E of FIG. 5E and/or blocks 515F through 525F of FIG. 5F can be omitted.

Further, while not shown explicitly in FIGS. 5C through 5F, the target UE could also trigger its own transition into CELL_DCH state by transmitting its own dummy packet. For example, upon receipt of the call announce message, the target UE can determine to accept the announced session and send an announce ACK. The announce ACK will typically be below the given size threshold, such that the target UE can further send the dummy packet to facilitate its transition to CELL_DCH state (e.g., because the dummy packet with a size above the Event 4a threshold will trigger the UE's transmission of a measurement report that will result in the RAN 120 transitioning the UE to CELL_DCH state).

Further, while not shown explicitly in FIGS. 5C through 5F, the target UE could also trigger its own transition into CELL_DCH state by transmitting a "fake" measurement message. For example, upon receipt of the call announce message, the target UE can determine to accept the announced session and send an announce ACK. The announce ACK will typically be below the given size threshold, such that the target UE can further generate a fake measurement report message and send it to the RAN to facilitate its transition to CELL_DCH state. Thus, even when no dummy packet is actually sent, the UE can send a measurement report indicating that the UE has a dummy-packet-sized amount of data to send so as to prompt its own transition to CELL_DCH state.

Figure 6B:
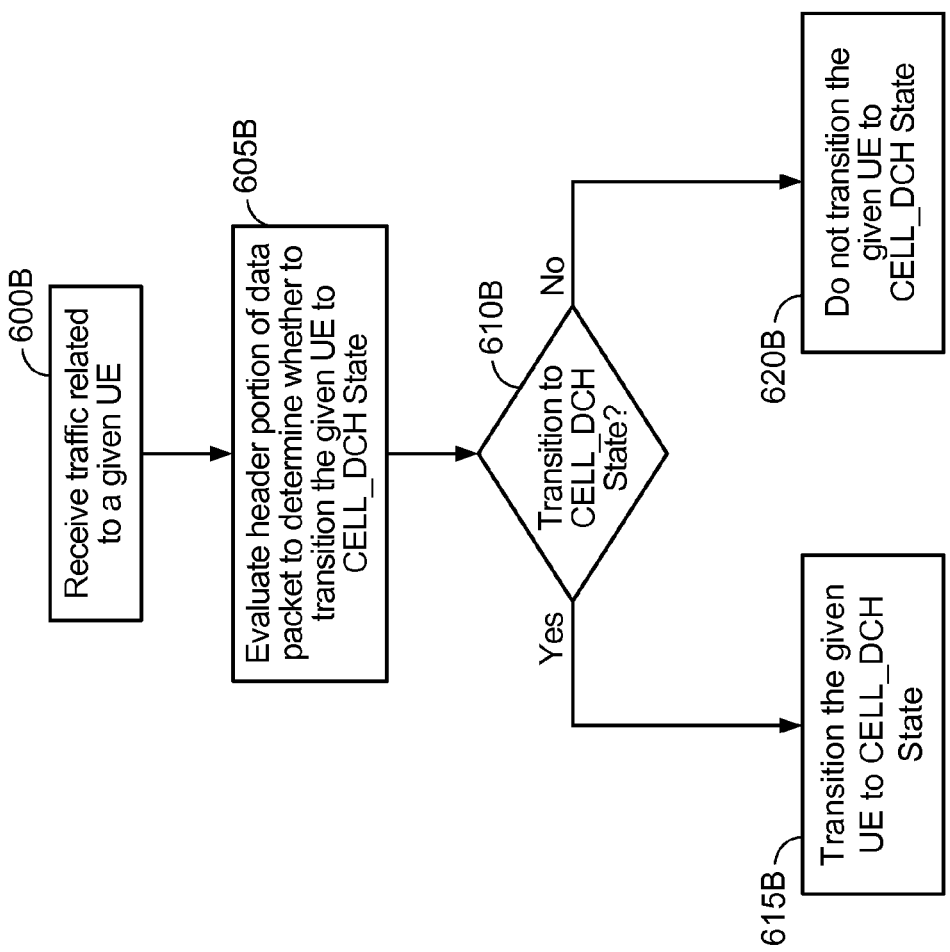
FIG. 6B illustrates a process that occurs at the RAN during the process of FIG. 6A in accordance with an embodiment of the invention.
Figure 6A:
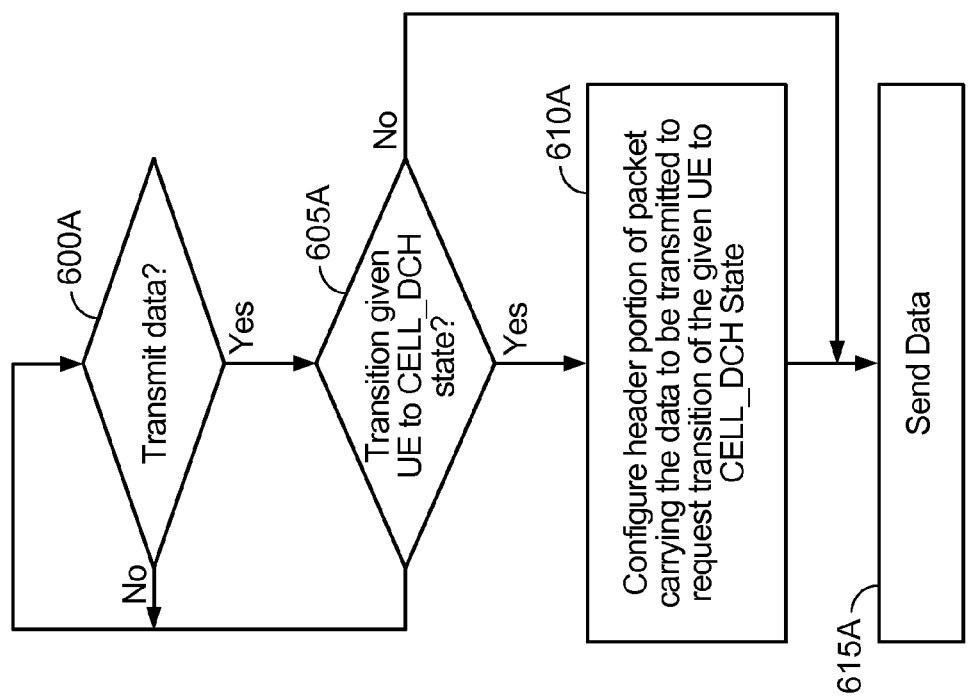
FIG. 6A illustrates a process of transmitting data in accordance with another embodiment of the invention.

FIG. 6A illustrates a process of transmitting data in accordance with an embodiment of the invention. The process of FIG. 6A occurs either at a UE (e.g., an originating UE or target UE) or the application server 170, and as such FIG. 6A is described below as performed at a network communication entity which can broadly be considered to correspond to any one of these network elements.

Referring to FIG. 6A, the network communication entity determines whether to transmit data to another network communication entity, 600A. For example, the determination of 600A can correspond to an originating UE determining whether to send a call request message to the application server 170 to initiate a communication session with at least one target UE. In another example, the determination of 600A can correspond to the application server 170 determining whether to send data, such as a call announce message announcing a communication session, to at least one target UE. In yet another example, the determination of 600A can correspond to a target UE having data (e.g., an announce ACK) back to the application server 170 after receiving the announce message. Of course, in other embodiments, the determination of 600A can correspond to other types of data for transmission.

If the network communication entity determines not to send data in 600A, no data is transmitted. Alternatively, if the network communication entity determines to send data in 600A, the network communication entity determines whether to set-up a DCH for a given UE associated with the data transmission by transitioning the UE to CELL_DCH state, 605A. For example, if the network communication entity performing the process of FIG. 6A is the originating UE or target UE, then the given UE corresponds to the UE performing the process of FIG. 6A, such that 605A corresponds to a determination of whether the network communication entity itself should transition to CELL_DCH state. In another example, if the network communication entity performing the process of FIG. 6A is the application server 170, then the given UE corresponds to the target UE for which the data transmission is intended, such that 605A corresponds to a determination of whether to transition the target UE to CELL_ DCH state.

If the network communication entity determines not to transition the given UE to CELL_DCH state in 605A, the process of FIG. 6A advances to 615A and the data is transmitted from the network communication entity. Alternatively, if the network communication entity determines to transition the given UE to CELL_DCH state in 605A, then the network communication entity configures a header portion of the data transmission to request transition of the given UE to CELL_ DCH state, 610A. The header portion can be of any layer that the RAN is configured to read. In an example, the configuration of 610A can correspond to setting a diffserv code point (DSCP) value within the header portion of an IP packet to a predetermined bit setting that functions to request the RAN 120 to transition the given UE to CELL_DCH state. In other words, when the RAN 120 receives a data packet with a DSCP value set to the predetermined bit setting, the RAN 120 will transition the UE that is transmitting or receiving the data packet to CELL_DCH state. Accordingly, the network communication entity can use the DSCP field in the packet header to trigger the CELL_DCH transition selectively in the embodiment of FIG. 6A. Accordingly, after the configuration of 610A, the network communication entity transmits the configured data in 615A.

FIG. 6B illustrates a process that occurs at the RAN 120 during the process of FIG. 6A in accordance with an embodiment of the invention. Referring to FIG. 6B, the RAN 120 receives traffic (e.g., one or more data packets) related to a given UE, 600B. The traffic received in 600B at the RAN 120 can correspond to receipt of the data transmission in 615A of FIG. 6A, for example. The RAN 120 evaluates the header of one or more data packets among the traffic received from 600B to determine whether to transition the given UE to CELL_DCH state in 605B. Based on the evaluation from 605B, the RAN 120 determines whether to transition the given UE to CELL_DCH state, 610B. If the evaluation indicates that the given UE is to be transitioned to CELL_DCH state, then the RAN 120 transitions the given UE, to which the traffic is either intended or sent from, to CELL_DCH state, 615B. However, if the evaluation does not indicate that the given UE is to be transitioned to CELL_DCH state, then the RAN 120 does not make the CELL_DCH transition of the given UE, 620B. As will be appreciated, the configuration of the header portion (e.g., the DSCP field or value set to a given DCH-trigger setting) of 610A from FIG. 6A ensures that the RAN 120's evaluation of 605B/610B will trigger the CELL_ DCH transition at 615B of FIG. 6B.

FIGS. 6C through 6F illustrate more detailed implementation examples of the processes of FIGS. 6A and 6B. In particular, FIGS. 6C and 6D cover examples whereby the network communication entity performing the process of FIG. 6A corresponds to an originating UE, and FIGS. 6E and 6F cover examples whereby the network communication entity performing the process of FIG. 6A corresponds to the application server 170.

Figure 6C:
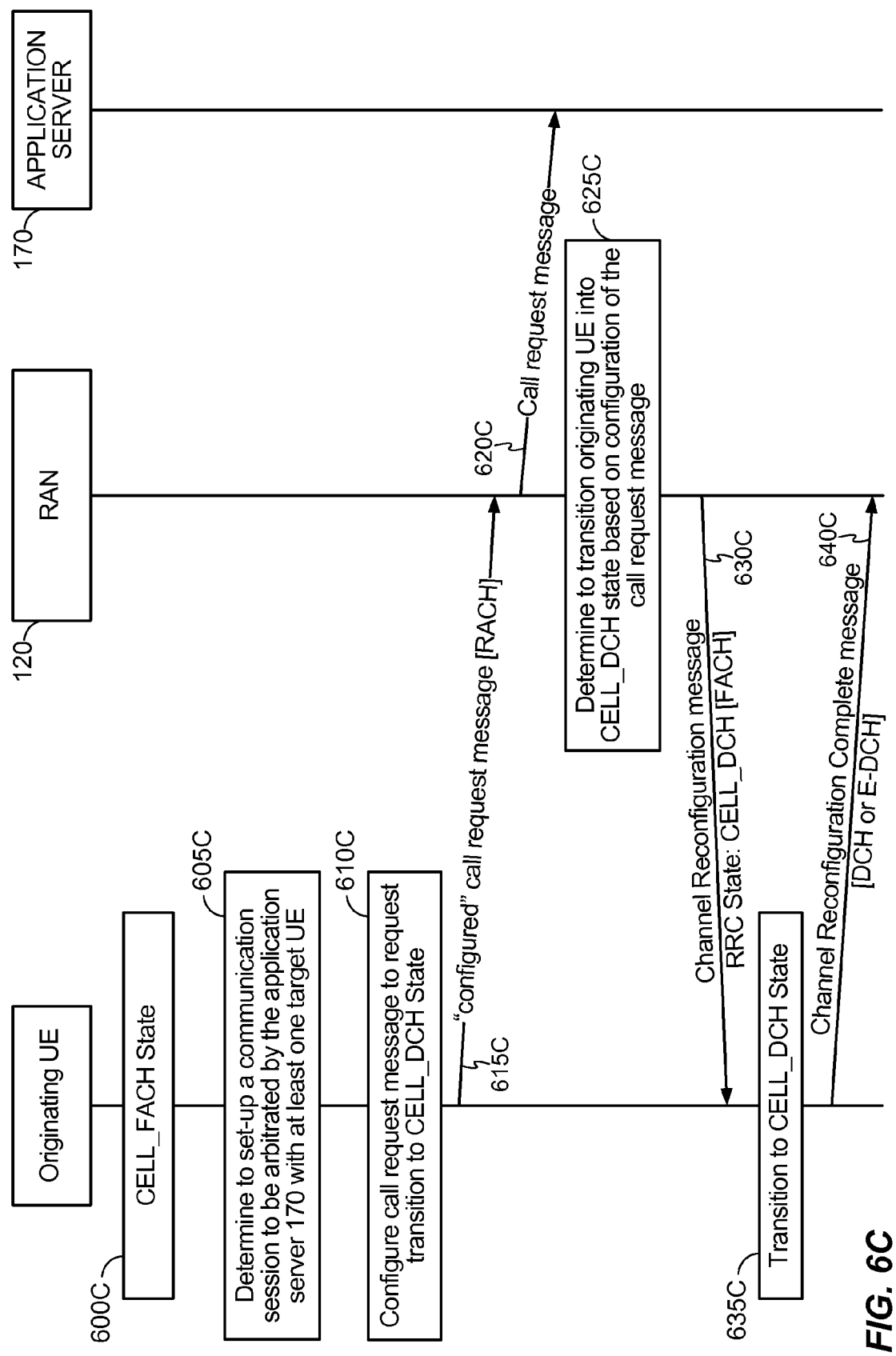
FIGS. 6C and 6D illustrate embodiments whereby a network communication entity performing the process of FIG. 6A corresponds to an originating UE attempting to transmit a call request message and call alert message, respectively, to an application server.

Referring to FIG. 6C, assume that a given UE ("originating UE") is operating in CELL_FACH state, 600C. While in CELL_FACH state, the given UE determines to initiate a communication session to be arbitrated by the application server 170 (e.g., in response to a user of the given UE pressing a PTT button), 605C. In the embodiment of FIG. 6C, it may be assumed that the determination by the given UE to initiate the communication session in 605C corresponds to a determination by the given UE to transmit data as in 600A of FIG. 6A and also to transition itself to CELL_DCH state, as in 605A of FIG. 6A. Thereby, the given UE configures a header-layer portion (e.g., a DSCP field or value) of a call request message to prompt the RAN 120 to transition the given UE to CELL_ DCH state, 610C. Accordingly, the given UE transmits the configured call request message on the RACH to the RAN 120, 615C. The RAN 120 receives the configured call request message on the RACH from the given UE, and forwards the call request message (e.g., with the same 'configured' header portion or a differently configured header portion) to the application server 170, 620C.

The RAN 120 also evaluates the header portion (e.g., the DSCP field) of the configured call request message (e.g., as in 605B of FIG. 6B) and determines to transition the given UE into CELL_DCH state based on the uplink traffic or data packet having a header portion configured to trigger the transition, 625C (e.g., as in 610B of FIG. 6B). Accordingly, the RAN 120 transmits a channel reconfiguration message (e.g., a RB Reconfiguration message) on the FACH to facilitate the given UE's transition from CELL_FACH to CELL_DCH state, 630C (e.g., as in 615B of FIG. 6B). Upon receiving the cell update confirm message of 630C, the given UE transitions from the CELL_FACH state to the CELL_DCH state, 635C. While not shown in FIG. 6C, the transition of 635C may include decoding the cell update confirm message, an L1 synchronization procedure, etc. Upon transitioning to CELL_ DCH state in 635C, the given UE sends a cell update confirm response message (e.g., RB Reconfiguration Complete message, etc.) to the RAN 120 on the reverse-link DCH or E-DCH, 640C.

Figure 6D:
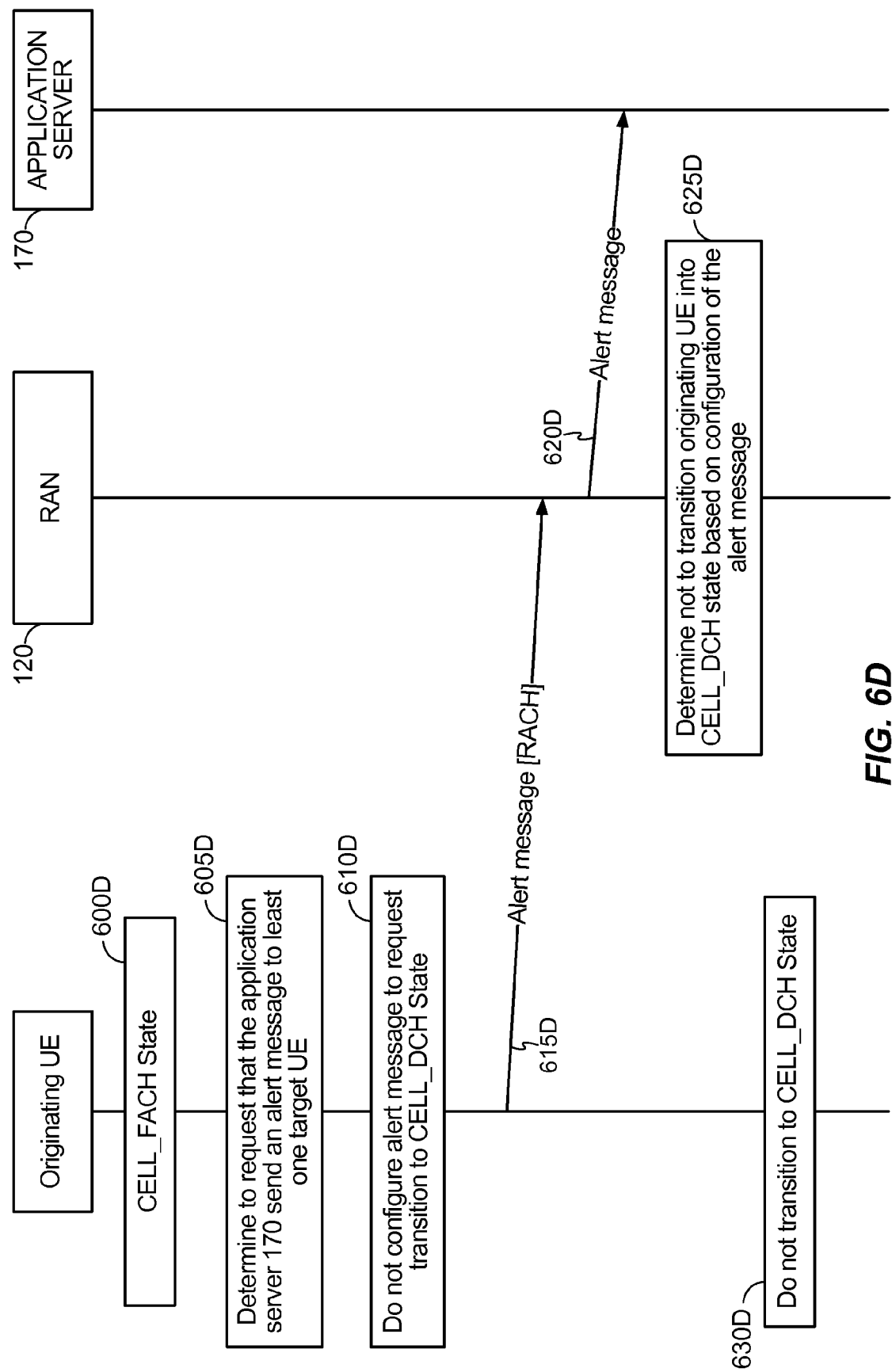

Referring to FIG. 6D, assume that a given UE ("originating UE") is operating in CELL_FACH state, 600D. While in CELL_FACH state, the given UE determines to request that an alert message be sent to at least one target UE, 605D. In the embodiment of FIG. 6D, it may be assumed that the determination by the given UE to send the alert message in 605D corresponds to a determination by the given UE to transmit data as in 600A of FIG. 6A without transitioning itself to CELL_DCH state, as in 605A of FIG. 6A.

Thereby, the given UE does not configure a header portion (e.g., a DSCP field or value) of the alert message to prompt the RAN 120 to transition the given UE to CELL_DCH state, 610D. Accordingly, the given UE transmits the un-configured alert message on the RACH to the RAN 120, 615D. The RAN 120 receives the un-configured alert message on the RACH from the given UE, and forwards the alert message to the application server 170, 620D.

The RAN 120 also evaluates the header portion (e.g., the DSCP field) of the alert message (e.g., as in 605B of FIG. 6B) and determines not to transition the given UE into CELL_DCH state based on the uplink traffic or data packet having a header portion that is not configured to trigger the transition, 625D (e.g., as in 610B of FIG. 6B). Thus, the given UE is not transitioned from the CELL_FACH state to the CELL_DCH state, 630D.

Figure 6E:
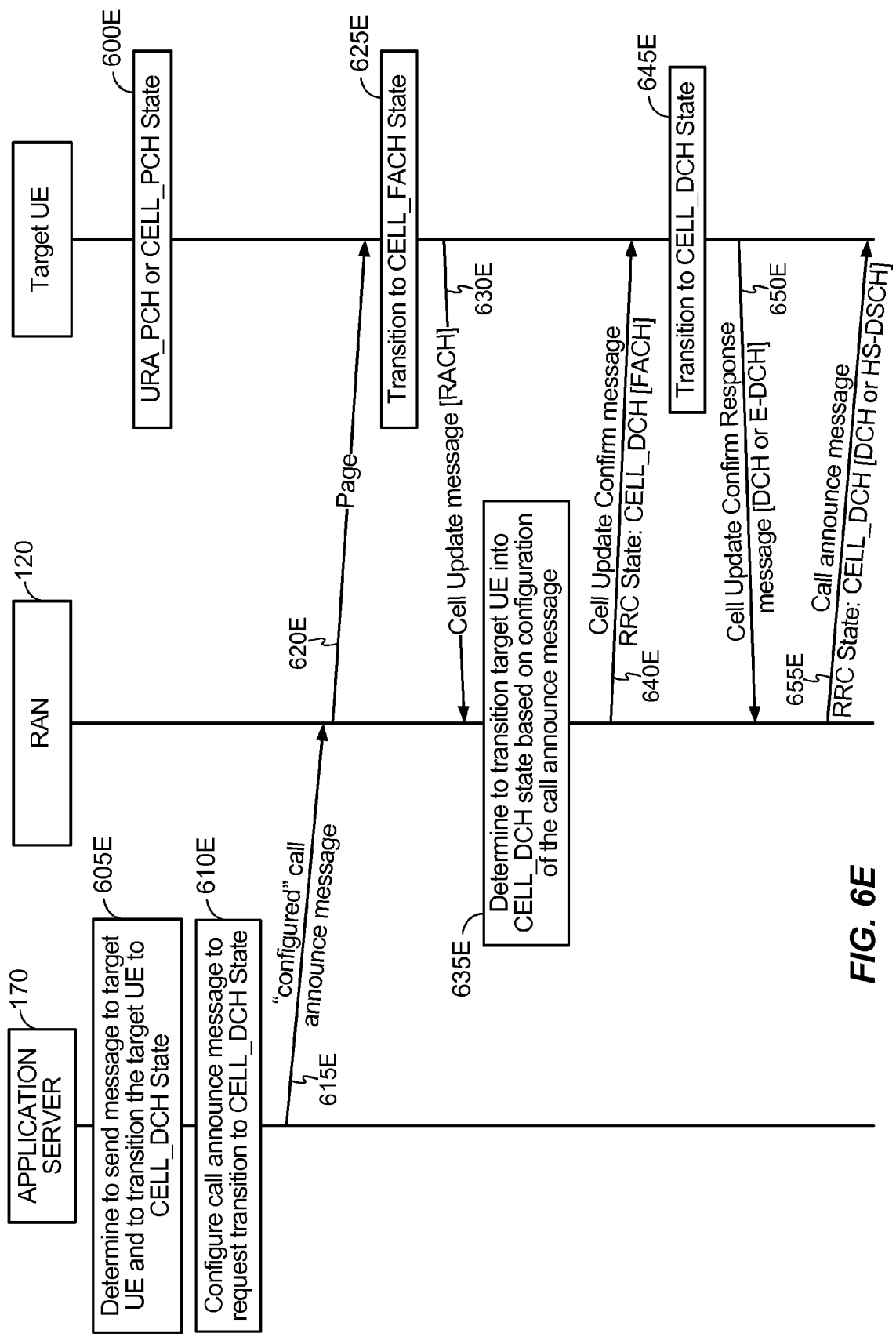
FIGS. 6E and 6F illustrate embodiments whereby a network communication entity performing the process of FIG. 6A corresponds to an application server attempting to transmit a call announce message and call alert message, respectively, to a target UE.

Referring to FIG. 6E, assume that the application server 170 has been requested to initiate a communication session to a given UE ("target UE"), and that the given UE is operating in either URA_PCH state or CELL_PCH state, 600E. Accordingly, the application server 170 determines to send a call announce message to the given UE and also to transition the given UE to CELL_DCH state, 605E. As will be appreciated, the determination of 605E corresponds to a determination to transmit data as in 600A of FIG. 6A and also to transition the given UE (i.e., the target UE, in this case) to CELL_DCH state, as in 605A of FIG. 6A.

Thereby, the application server 170 configures a header portion (e.g., a DSCP field or value) of a call announce to prompt the RAN 120 to transition the given UE to CELL_DCH state, 610E. Accordingly, the application server 170 transmits the configured call announce message to the RAN 120, 615E, and the RAN 120 pages the target UE, 620E. The target UE receives and decodes the page message and transitions to CELL_FACH state, 625E, and the target UE transmits a cell update message on the RACH to the RAN 120, 630E.

The RAN 120 also evaluates the header portion (e.g., the DSCP field) of the configured call announce message (e.g., as in 605B of FIG. 6B) and determines to transition the given UE into CELL_DCH state based on the downlink traffic or data packet having a header portion configured to trigger the transition, 635E (e.g., as in 610B of FIG. 6B). Accordingly, the RAN 120 transmits a cell update confirm message (e.g., a RB Reconfiguration message) on the FACH to facilitate the given UE's transition from CELL_FACH to CELL_DCH state, 640E (e.g., as in 615B of FIG. 6B). Upon receiving the cell update confirm message of 640E, the given UE transitions from the CELL_FACH state to the CELL_DCH state, 645E. While not shown in FIG. 6E, the transition of 645E may include decoding the cell update confirm message, an L1 synchronization procedure, etc. Upon transitioning to CELL_DCH state in 645E, the target UE sends a cell update confirm response message (e.g., RB Reconfiguration Complete message, etc.) on the DCH or E-DCH, 650E, after which the RAN 120 transmits the call announce message to the target UE on the downlink DCH or HS-DSCH, 655E.

Figure 6F:
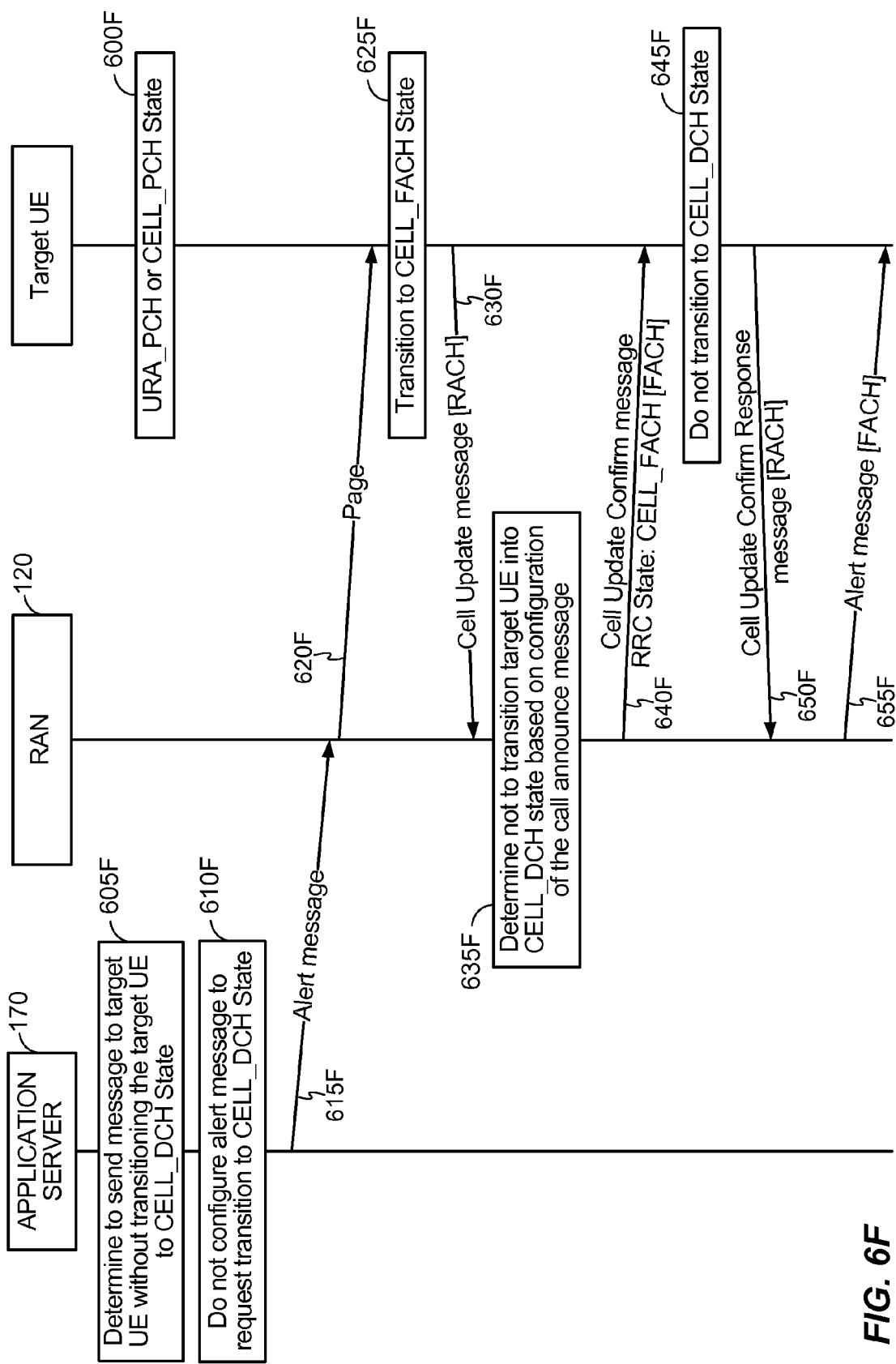

Referring to FIG. 6F, assume that the application server 170 has been requested to send an alert message to a given UE ("target UE"), and that the given UE is operating in either URA_PCH state or CELL_PCH state, 600F. In the embodiment of FIG. 6F, it may be assumed that the determination by the application server 170 to send the alert message in 605F corresponds to a determination by the application server 170 to transmit data, as in 600A of FIG. 6A, without transitioning the target UE to CELL_DCH state, as in 605A of FIG. 6A.

Thereby, the application server 170 does not configure a header portion (e.g., a DSCP field or value) of the alert message to prompt the RAN 120 to transition the given UE to CELL_DCH state, 610F. Accordingly, the application server 170 sends the un-configured alert message to the RAN 120, 615F, and the RAN 120 pages the target UE, 620F. The target UE decodes the page message from 620F and transitions to CELL_FACH state, 625F, and the target UE sends a cell update message on the RACH to the RAN 120, 630F.

The RAN 120 also evaluates the header portion (e.g., the DSCP field) of the alert message (e.g., as in 605B of FIG. 6B) and determines not to transition the given UE into CELL_DCH state based on the downlink traffic or data packet having a header portion that is not configured to trigger the transition, 635F (e.g., as in 610B of FIG. 6B). Thus, the given UE is not transitioned from the CELL_FACH state to the CELL_DCH state (e.g., as in 620B of FIG. 6B). Instead, the RAN 120 transmits a cell update confirm message on the FACH to the target UE without triggering a transition of the target UE to CELL_DCH state (i.e., RRC state: CELL_FACH), 640F, and the target UE remains in CELL_FACH state, 645F. The target UE sends a cell update confirm response message on the RACH back to the RAN 120, 650F, and the RAN 120 transmits the alert message to the target UE on the FACH, 655F.

While FIGS. 6E and 6F are directed to examples whereby the target UE is initially in URA_PCH or CELL_PCH state, it will be appreciated that the target UE could also be in CELL_FACH state when the RAN 120 receives the application server 170's request to transmit data (e.g., the call announce message in FIG. 6E, or the alert message in FIG. 6F) to the target UE. In the case where the target UE is already in CELL_FACH state, it will be appreciated that blocks 615E through 630E of FIG. 6E and/or blocks 620F through 630F of FIG. 6F can be omitted.

Embodiments of the invention described above with respect to FIGS. 5A through 6F relate to changes in behavior at the application server 170, the RAN 120 and/or the originating or target UEs. FIGS. 7A through 7D are directed to another embodiment of the invention whereby the behavioral changes occur exclusively at the RAN 120, such that the RAN 120 makes a decision with regard to whether to transition a given UE to CELL_DCH state based on an evaluation of normal-traffic being exchanged between the given UE and the application server 170.

Figure 7A:
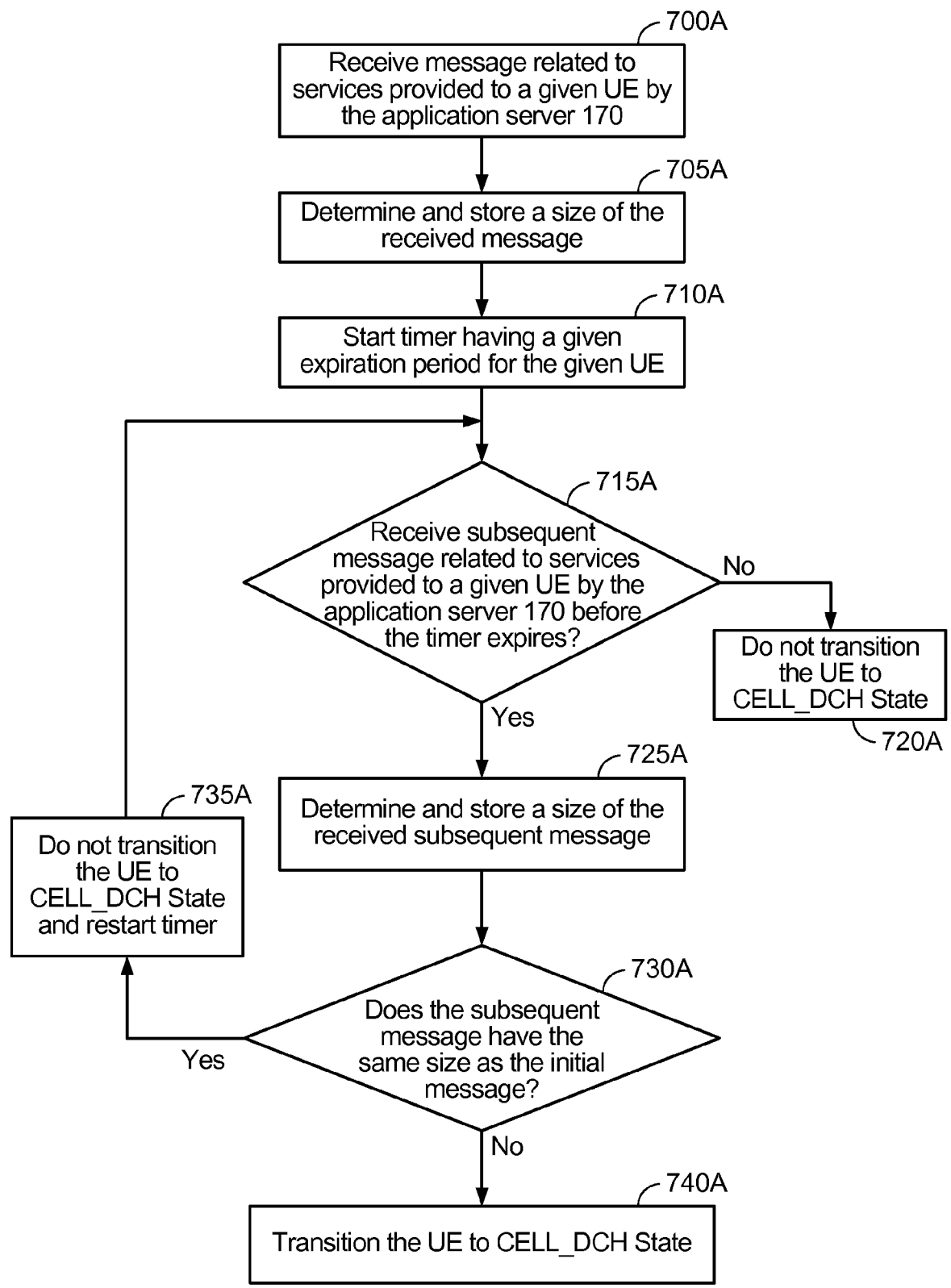
FIG. 7A illustrates a process that occurs at the RAN in accordance with an embodiment of the invention.

FIG. 7A illustrates a process that occurs at the RAN 120 in accordance with an embodiment of the invention. Referring to FIG. 7A, the RAN 120 receives a message (e.g., a data packet) related to services provided to a given UE by the application server 170, 700A. In an example, the message or data packet received in 700A can correspond to a call request message sent by an originating UE, a call announce message sent by the application server 170 and intended for a target UE, an announce ACK (accept) message sent by the target UE responsive to the announce message and/or any other message exchanged between a UE and the application server 170.

Upon receiving the message at the RAN 120, the RAN 120 determines a size of the received message, and stores the determined size of the received message at the RAN 120, 705A. For example, the determined size of the received message in 705A can correspond to how many bits or bytes are included in a data payload portion of the received message from 700A. In 710A, the RAN 120 starts a timer having a given expiration period for the given UE associated with the message received in 700A. In an example, the given expiration period can be set to a duration within which at least one additional message of a different size would be expected if the message received in 700A were associated with a communication session of the given UE (e.g., 500 milliseconds (ms), 5 seconds, etc.).

The RAN 120 next determines whether any subsequent messages related to the high QoS RB (for the services provided to the given UE by the application server 170) are received before the timer started in 710A expires, 715A. If the RAN 120 determines that the timer expires before any other related messages are received, the RAN 120 does not transition the given UE to CELL_DCH state, 720A. Otherwise, if the RAN 120 determines that one or more subsequent messages related to the high QoS RB are received before the timer started in 710A expires, the RAN 120 determines a size of the subsequent message, and stores the determined size of the subsequent message at the RAN 120, 725A.

In 730A, the RAN 120 compares the determined size of the message received in 700A to the determined size of the subsequent message. If the RAN 120 determines that the sizes of the message from 700A and the subsequent message are the same, the RAN 120 does not transition the given UE to CELL_DCH state and also resets the timer, 735A, after which the process returns to 715A and the RAN 120 waits to receive another subsequent, related message before the expiration of the timer. For example, refraining from transitioning a UE to CELL_DCH state when same-sized messages are received can reduce an occurrence of CELL_DCH state transitions for re-transmissions of alert messages.

Otherwise, if the RAN 120 determines that the sizes of the message from 700A and the subsequent message are not the same, the RAN 120 infers that the given UE is participating in some type of communication session with the application server 170, and thereby initiates a transition of the given UE to CELL_DCH state, 740A (e.g., by sending a cell update confirm message, such as a RB Reconfiguration message, in an example).

Figure 7B:
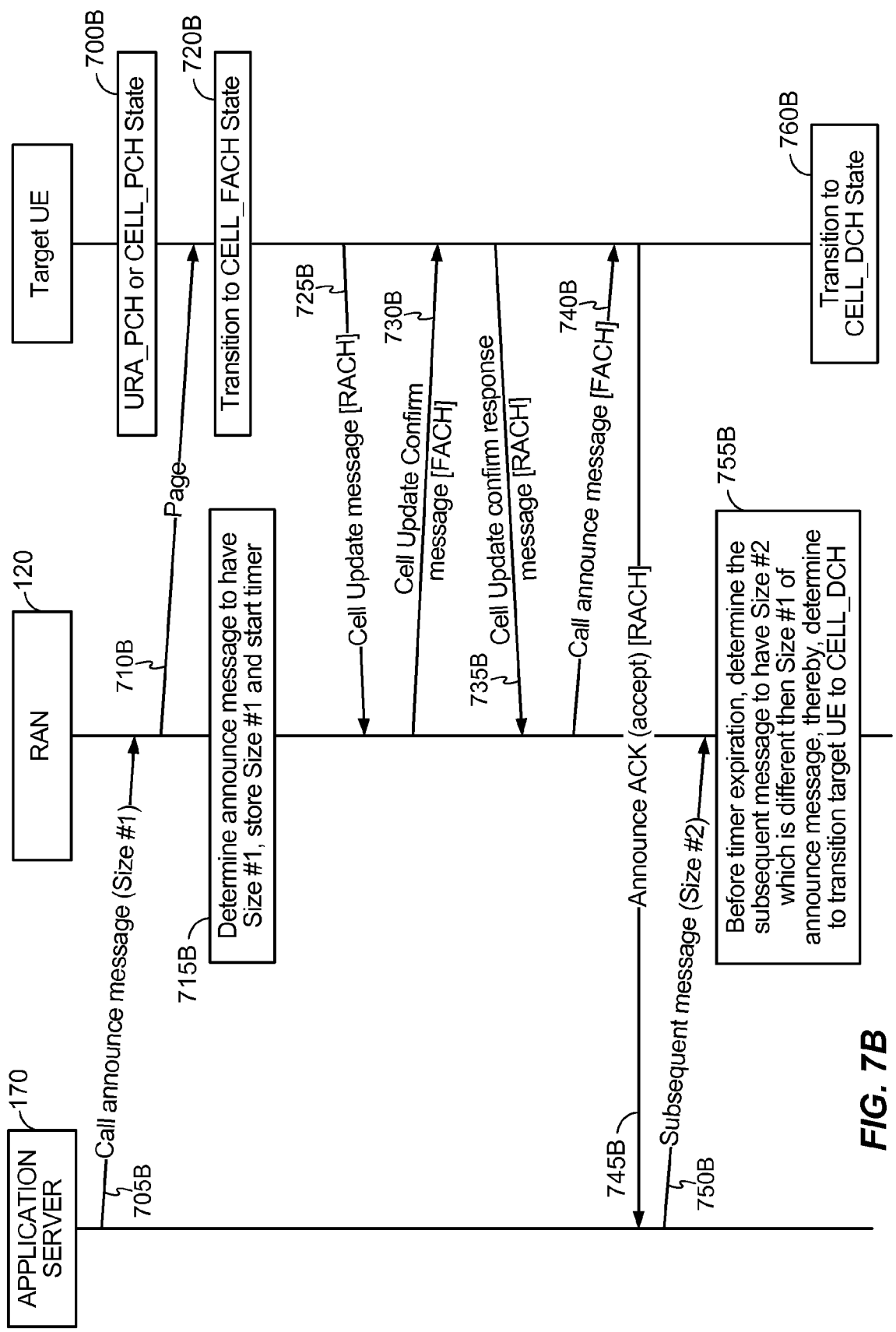
FIGS. 7B through 7D illustrate different examples of implementations of the process of FIG. 7A in accordance with embodiments of the invention.
Figure 7C:
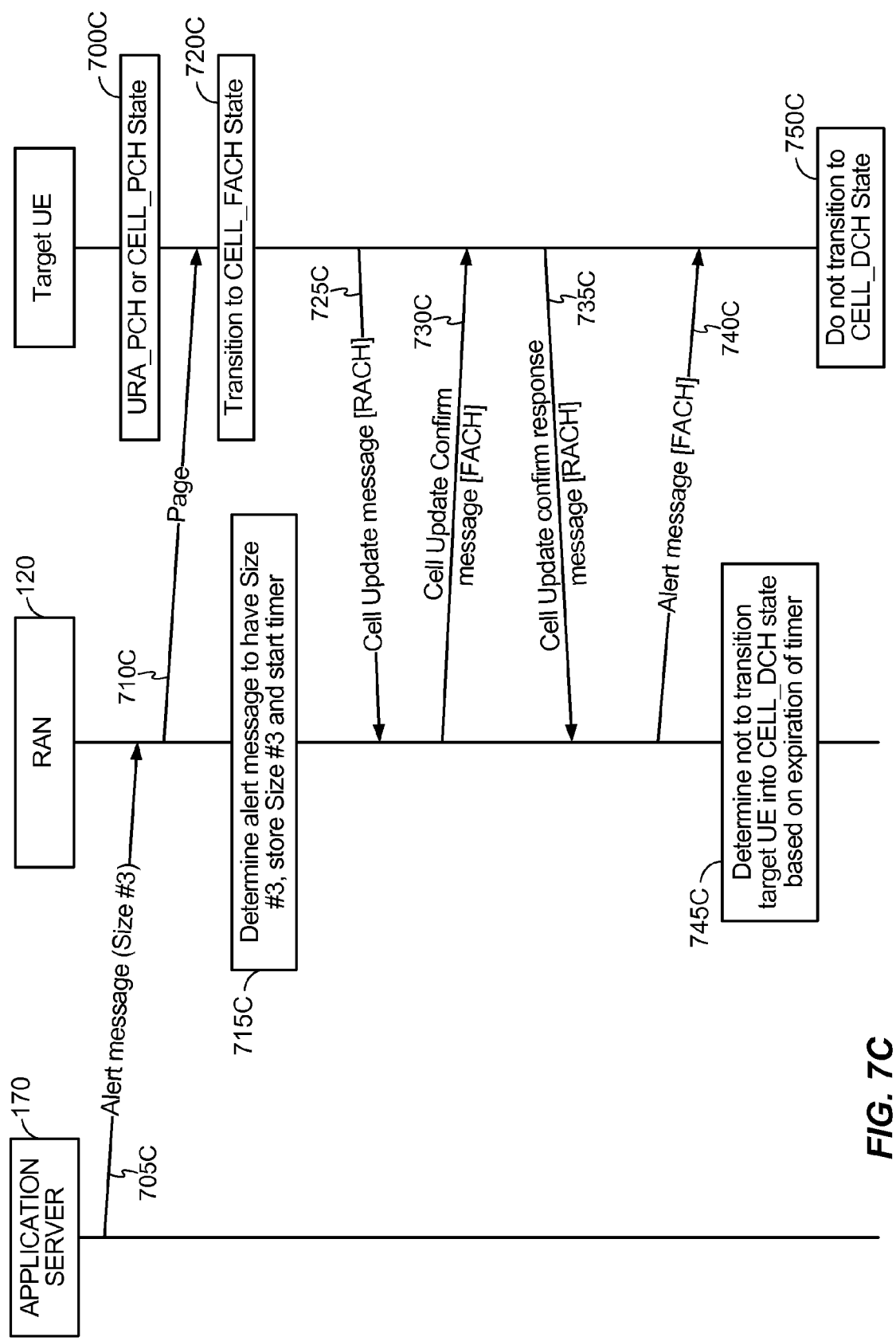
Figure 7D:
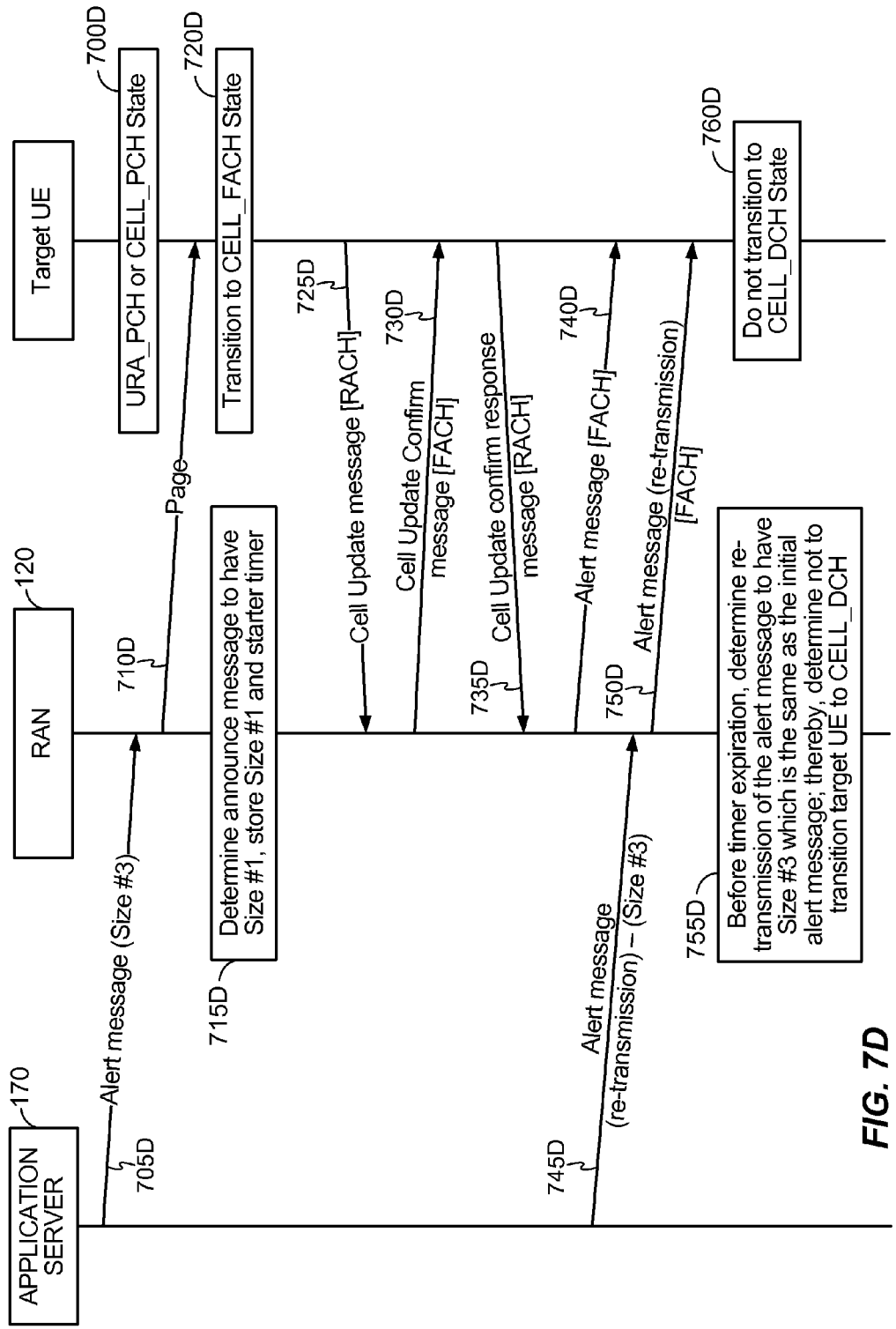

FIGS. 7B through 7D illustrate more detailed implementation examples of the process of FIG. 7A. In particular, FIGS. 7B through 7D cover examples whereby the message(s) received by the RAN 120 are related to a target UE. However, it will be appreciated that other embodiments could be directed to messaging related to an originating UE.

Referring to FIG. 7B, assume that the application server 170 has been requested to send a call announce message to a given UE ("target UE"), and that the given UE is operating in either URA_PCH state or CELL_PCH state, 700B. Accordingly, the application server 170 sends the call announce message to the RAN 120, 705B, and the RAN 120 pages the target UE, 710B. In the embodiment of FIG. 7B, assume that the call announce message has a first size. As such, the RAN 120 determines the size of the call announce message (e.g., the first size), stores the first size in association with a record related to the target UE, and starts a timer having a given expiration period, 715B (e.g., as in 705A and 710A of FIG. 7A). Upon receiving the page message in 710B, the target UE transitions to CELL_FACH state, 720B, responds to the page message by sending a cell update message on the RACH, 725B, and the RAN 120 sends a cell update confirm message to the target UE, 730B. At this point, the cell update confirm message of 730B does not instruct the target UE to transition to CELL_DCH state because two or more different-sized messages have not yet been received within the timer period. The target UE thereby remains in CELL_FACH state and sends a cell update confirm response message on the RACH, 735B, and the RAN 120 then sends the call announce message on the FACH to the target UE, 740B.

When the target UE receives and decodes the call announce message in 740B, assume that the target UE determines to accept the announced communication session and thereby sends an announce ACK (accept) message back to the application server 170, 745B. Upon receiving a call acceptance from a first responder of the announced communication session, the application server 170 sends at least one subsequent message to the RAN 120 for each session participant (including the target UE) that includes information related to the remaining steps for establishing the session, 750B. In the embodiment of FIG. 7B, assume that the subsequent message of 750B is sent before the timer started in 715B expires, and that the subsequent message has a second size that is different from the first size of the call announce message. The RAN 120 determines the sizes of the call announce message from 705B and the subsequent message from 750B to be different, and thereby determines to transition the target UE from CELL_FACH state to CELL_DCH state, 755B (e.g., as in 730A and 740A of FIG. 7A).

The RAN 120 thereby instructs the target UE to transition to CELL_DCH state, 760B. While not explicitly shown in FIG. 7B, the CELL_DCH transition can be prompted by a cell update confirm message (e.g., a RB Reconfiguration message) transmitted on the FACH to facilitate the target UE's transition from CELL_FACH to CELL_DCH state.

Referring to FIG. 7C, assume that the application server 170 has been requested to send an alert message to a given UE ("target UE"), and that the given UE is operating in either URA_PCH state or CELL_PCH state, 700C. Accordingly, the application server 170 sends the alert message to the RAN 120, 705C, and the RAN 120 pages the target UE, 710C. In the embodiment of FIG. 7C, assume that the alert message has a third size (e.g., different than the sizes of the 705B and 750B messages from FIG. 7B). As such, the RAN 120 determines the size of the call alert message (e.g., the third size), stores the third size in association with a record related to the target UE, and starts a timer having a given expiration period, 715C (e.g., as in 705A and 710A of FIG. 7A). Upon receiving and decoding the page message, the target UE transitions to CELL_FACH state, 720C, and the target UE sends a cell update message on the RACH, 725C. The RAN 120 receives the cell update message and sends a cell update confirm message on the FACH, 730C, and the target UE responds to the cell update confirm message with a cell update confirm response message on the RACH, 735C. Then, the RAN 120 transmits the alert message to the target UE on the FACH, 740C.

Because alert messages are often notification-type messages that do not result in a significant amount of additional traffic between the target UE and the application server 170, assume in the embodiment of FIG. 7C that no additional messages are exchanged between the application server 170 and target UE before expiration of the timer. Accordingly, the RAN 120 determines that no subsequent, related messages were received before the timer's expiration (e.g., as in 715A of FIG. 7A), and thereby determines not to transition the target UE from CELL_FACH state to CELL_DCH state, 745C (e.g., as in 720A of FIG. 7A). Thus, the target UE is not transitioned from the CELL_FACH state to the CELL_DCH state, 750C.

Referring to FIG. 7D, 700D through 740D correspond to 700C through 740C of FIG. 7C, respectively, and as such will not be described further for the sake of brevity. At some point after the transmission of the initial alert message in 705D and before the expiration of the timer in 715D, assume that the application server 170 determines to re-transmit the same alert message. For example, the application server 170 can determine to re-transmit if the target UE does not send an ACK to the alert message. Accordingly, the application server 170 re-transmits the alert message in 745D, and the RAN 120 re-transmits the alert message to the target UE on the FACH, 750D.

In the embodiment of FIG. 7D, because the alert message of 745D is simply a re-transmission of the alert message from 705D, both alert messages have the same size (e.g., the third size). Thereby, the RAN 120 determines the sizes of the alert message from 705D and the re-transmitted alert message from 745D to be the same, and further determines not to transition the target UE from CELL_FACH state to CELL_DCH state, 755D (e.g., as in 730A and 735A of FIG. 7A). Thus, the RAN 120 stores the third size for the re-transmitted alert message and resets the timer in 755D, and the target UE is not transitioned from the CELL_FACH state to the CELL_DCH state, 760D.

While references in the above-described embodiments of the invention have generally used the terms 'call' and 'session' interchangeably, it will be appreciated that any call and/or session is intended to be interpreted as inclusive of actual calls between different parties, or alternatively to data transport sessions that technically may not be considered as 'calls'. Also, while above-embodiments have generally described with respect to PTT sessions, other embodiments can be directed to any type of communication session, such as a push-to-transfer (PTX) session, an emergency VoIP call, etc.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating an application server within a wireless communications system operating in accordance with a given wireless communication protocol, comprising:
   receiving a message of a given type at the application server for transmission to a target user equipment (UE);
   determining whether to facilitate a transition of the target UE into a dedicated-channel state based on the given type of the message;
   if the application server determines to transition the target UE into the dedicated-channel state,
      configuring supplemental data to prompt an access network to transition the target UE to the dedicated-channel state, and
      transmitting the configured supplemental data along with the message to the access network for transmission to the target UE; and
   if the application server determines not to transition the target UE into the dedicated-channel state,
      transmitting the message to the access network for transmission to the target UE without the configured supplemental data.

2. The method of claim 1, wherein the configured supplemental data corresponds to dummy data with a size that is at least equal to a given size threshold.

3. The method of claim 2, wherein the given size threshold corresponds to an Event Traffic Volume Measurement (TVM) threshold that is used by the access network for making dedicated-channel state transition decisions for its UEs.

4. The method of claim 1,
wherein the configured supplemental data is contained within a header portion of an Internet Protocol (IP) packet containing the message, and
wherein the configured supplemental data functions to request the access network to transition the UE to the dedicated-channel state.

5. The method of claim 4,
wherein the configured supplemental data corresponds to a given bit setting of a diffserv code point (DSCP) value within the header portion of the IP packet.

6. The method of claim 1,
wherein the target UE corresponds to a target of a communication session with that was originated by another UE.

7. The method of claim 1,
wherein the given type of the message corresponds to an alert message that is not directly associated with a delay-sensitive and/or low data-rate communication session, and
wherein the given type of the message corresponding to the alert message prompts the application server not to facilitate the transition of the target UE to the dedicated-channel state.

8. The method of claim 1,
wherein the given type of the message corresponds to a session message that is directly associated with a delay-sensitive and/or low data-rate communication session, and
wherein the given type of the message corresponding to the session message prompts the application server facilitate the transition of the target UE to the dedicated-channel state.

9. The method of claim 8, wherein the session message corresponds to an announce message configured to announce the communication session to the target UE.

10. An application server within a wireless communications system operating in accordance with a given wireless communication protocol, comprising:
means for receiving a message of a given type for transmission to a target user equipment (UE);
means for determining whether to facilitate a transition of the target UE into a dedicated-channel state based on the given type of the message;
means for configuring supplemental data, if the application server determines to transition the target UE into the dedicated-channel state, to prompt an access network to transition the target UE to the dedicated-channel state, and means for transmitting the configured supplemental data along with the message to the access network for transmission to the target UE; and
means for transmitting, if the application server determines not to transition the target UE into the dedicated-channel state, the message to the access network for transmission to the target UE without the configured supplemental data.

11. An application server within a wireless communications system operating in accordance with a given wireless communication protocol, comprising:
equipment configured to receive a message of a given type for transmission to a target user equipment (UE);
equipment configured to determine whether to facilitate a transition of the target UE into a dedicated-channel state based on the given type of the message;
equipment configured to configure supplemental data, if the application server determines to transition the target UE into the dedicated-channel state, to prompt an access network to transition the target UE to the dedicated-channel state, and equipment configured to transmit the configured supplemental data along with the message to the access network for transmission to the target UE; and
equipment configured to transmit, if the application server determines not to transition the target UE into the dedicated-channel state, the message to the access network for transmission to the target UE without the configured supplemental data.

12. A non-transitory computer-readable storage medium containing instructions stored thereon, which, when executed by an application server within a wireless communications system operating in accordance with a given wireless communication protocol, cause the application server to perform actions, the instructions comprising:
program code to receive a message of a given type for transmission to a target user equipment (UE);
program code to determine whether to facilitate a transition of the target UE into a dedicated-channel state based on the given type of the message;
program code to configure supplemental data, if the application server determines to transition the target UE into the dedicated-channel state, to prompt an access network to transition the target UE to the dedicated-channel state, and program code to transmit the configured supplemental data along with the message to the access network for transmission to the target UE; and
program code to transmit, if the application server determines not to transition the target UE into the dedicated-channel state, the message to the access network for transmission to the target UE without the configured supplemental data.

* * * * *